(12) United States Patent
Dai et al.

(10) Patent No.: US 12,489,492 B2
(45) Date of Patent: Dec. 2, 2025

(54) BEAM PATTERN INFORMATION INDICATION IN POSITIONING AND SENSING

(71) Applicant: QUALCOMM Incorporated, San Diego, CA (US)

(72) Inventors: Yucheng Dai, San Diego, CA (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 243 days.

(21) Appl. No.: 18/448,588

(22) Filed: Aug. 11, 2023

(65) Prior Publication Data

US 2025/0055509 A1    Feb. 13, 2025

(51) Int. Cl.
*H04B 7/0426* (2017.01)
*H04B 17/15* (2015.01)

(52) U.S. Cl.
CPC ........... *H04B 7/0447* (2013.01); *H04B 17/15* (2015.01)

(58) Field of Classification Search
CPC .......... H04B 7/06; H04B 7/08; H04B 7/0417; H04B 7/0456; H04B 7/0447; H04B 7/0482; H04B 17/15; H04L 5/00; H04Q 7/00; H04W 56/00; H04W 64/00; H04W 72/04; H04W 72/12
USPC ......... 370/250–252, 328; 375/219, 260, 262, 375/267, 295, 316
See application file for complete search history.

(56) References Cited

U.S. PATENT DOCUMENTS

2020/0119785 A1    4/2020  Varatharaajan et al.
2021/0126684 A1*   4/2021  Chen ................... H04B 7/0482

FOREIGN PATENT DOCUMENTS

WO    2022159920    7/2022

OTHER PUBLICATIONS

International Search Report and Written Opinion—PCT/US2024/038284—ISA/EPO—Jan. 7, 2025.
Partial International Search Report—PCT/US2024/038284—ISA/EPO—Nov. 5, 2024.

* cited by examiner

*Primary Examiner* — Shawkat M Ali
(74) *Attorney, Agent, or Firm* — SUNSTEIN LLP

(57) ABSTRACT

A beam pattern processing device includes: one or more memories; a transceiver; and one or more processors, communicatively coupled to the one or more memories and the transceiver. The one or more processors are configured to: configure a beam pattern information to include a sampling method of a plurality of sampling methods defining a sampling grid; send a request, including the beam pattern information, for a sampled beam pattern of the network device; and receive the sampled beam pattern obtained based on the beam pattern information.

31 Claims, 12 Drawing Sheets

BEAM PATTERN INFORMATION INDICATION IN POSITIONING AND SENSING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In one embodiment, a beam pattern processing device includes: one or more memories; a transceiver; and one or more processors, communicatively coupled to the one or more memories and the transceiver. The one or more processors are configured to: configure a beam pattern information including a sampling method of a plurality of sampling methods defining a sampling grid; send a request for a sampled beam pattern of the network device, the request including the beam pattern information; and receive the sampled beam pattern obtained based on the beam pattern information.

In another embodiment, a method for providing a beam pattern of a network device, includes: configuring a beam pattern information including a sampling method of a plurality of sampling methods, the sampling method defining a sampling grid; sending a request for a sampled beam pattern of the network device, the request including the beam pattern information; and receiving the sampled beam pattern obtained based on the beam pattern information.

In another embodiment, a beam pattern processing device, includes: means for configuring a beam pattern information, the beam pattern information including a sampling method of a plurality of sampling methods defining a sampling grid; means for sending a request for a sampled beam pattern of the network device, the request including the beam pattern information; and means for receiving the sampled beam pattern obtained based on the beam pattern information.

In another embodiment, a non-transitory, processor-readable storage medium comprising processor-readable instructions to cause one or more processors of a beam pattern processing device to: configure a beam pattern information including a sampling method of a plurality of sampling methods defining a sampling grid; send a request for a sampled beam pattern of the network device, the request including the beam pattern information; and receive the sampled beam pattern obtained based on the beam pattern information.

DETAILED DESCRIPTION

Figure 1:
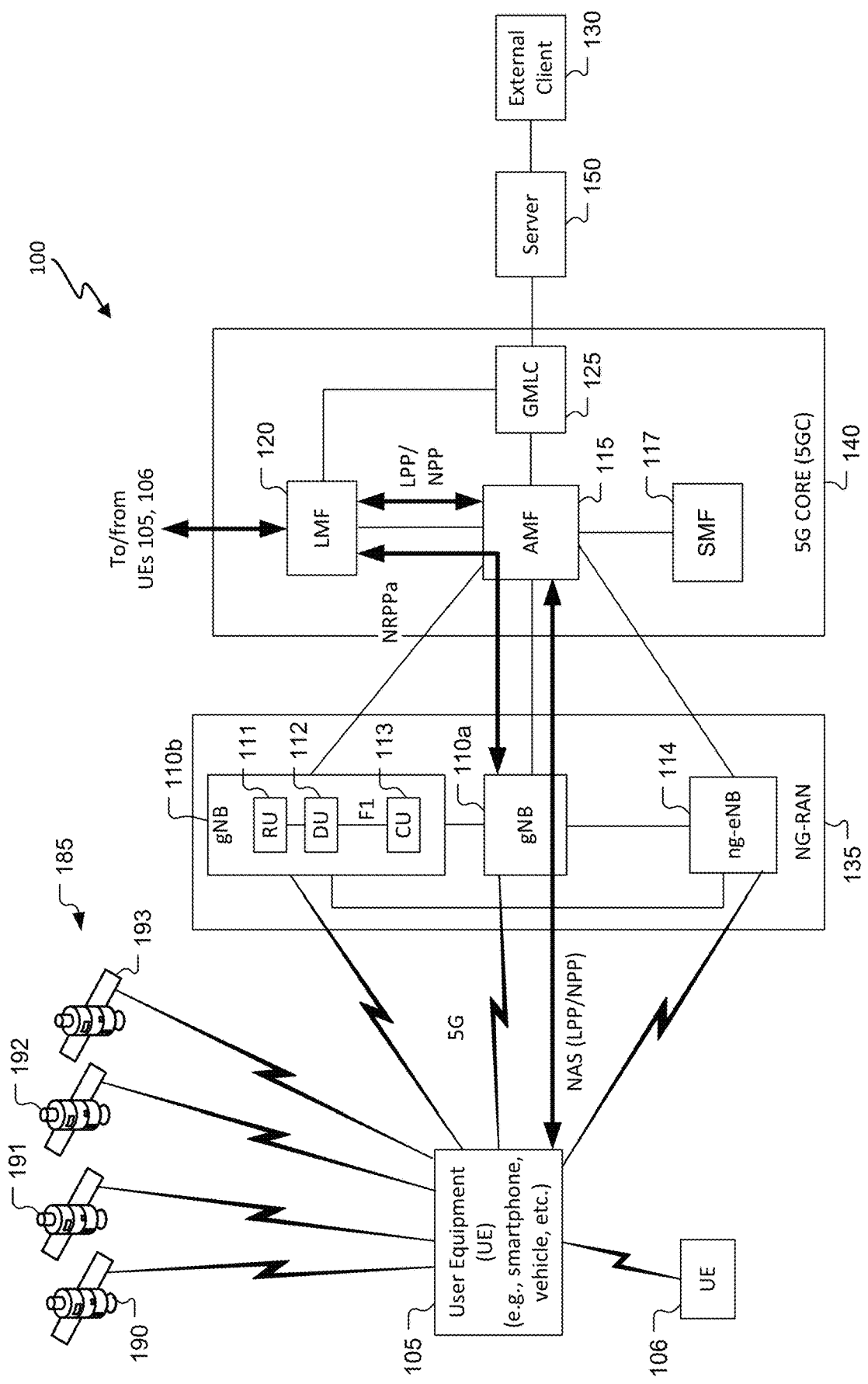
FIG. 1 is a simplified diagram of an example wireless communications system.

Techniques are discussed herein for obtaining and providing a sampled beam pattern of a network device (e.g., a base station of a user equipment) for use in obtaining, in one or more arbitrary directions, one or more beam gains for a beam transmitted by the network device. A beam pattern processing device may configure a beam pattern information by selecting a sampling method from a plurality of sampling methods that defines a sampling grid, a segmenting method that defines regions of the sampling grid, and one or more sampling direction densities to be associated with each of the regions. The sampling method may include a uniform distribution of sampling directions that may have been used by a manufacturer of the network device to sample beams transmitted by the antennas of the network device. The segmenting method may be selected based on the variations of the beam gains of an initial sampled beam pattern of the network device. The sampling direction densities may be associated with each region, such that denser sampling directions may be applied to regions with higher variations in the beam gains than regions with lower variations in the beam gains. The beam pattern processing device may send the beam pattern information to a beam pattern reporting device. The beam pattern reporting device may obtain a sampled beam pattern by obtaining the beam pattern corresponding to the sampling method, segmenting the sampling grid into one or more regions based on the segmenting method, and associating a sampling direction density to each region. The beam pattern reporting device may send the sampled beam pattern to the beam pattern processing device, which may use the sampled beam pattern to obtain beam gains in one or more arbitrary directions.

Items and/or techniques described herein may provide one or more of the following capabilities, as well as other capabilities not mentioned. More samples of the beam pattern may be obtained in directions of greater beam gain variations than directions of lesser beam gain variations, which improves the representation of the beam shape of the beams transmitted by the network device. The improved representation of the beam shape improves the performance of an application which uses the beam gains obtained using the sampled beam pattern. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (CNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-cNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any, or all of which may be utilized as appropriate, and each of which may be duplicated or omitted, as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more, or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality, respectively.

The system 100 is capable of wireless communication in that components of the system 100 can communicate with one another (at least some times using wireless connections) directly or indirectly, e.g., via the gNBs 110a. 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-CNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a. 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-cNB 114 may be connected to one or more of the gNBs 110a, 110b in the NG-RAN 135, possibly via one or more other gNBs and/or one or more other ng-eNBs. The ng-cNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share one or more processors but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-cNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*. 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*. 110*b* or the ng-eNB 114) and/or may be used by the LMF 120 to obtain location related information from the gNBs 110*a*, 110*b* and/or the ng-cNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*. 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-cNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*. 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
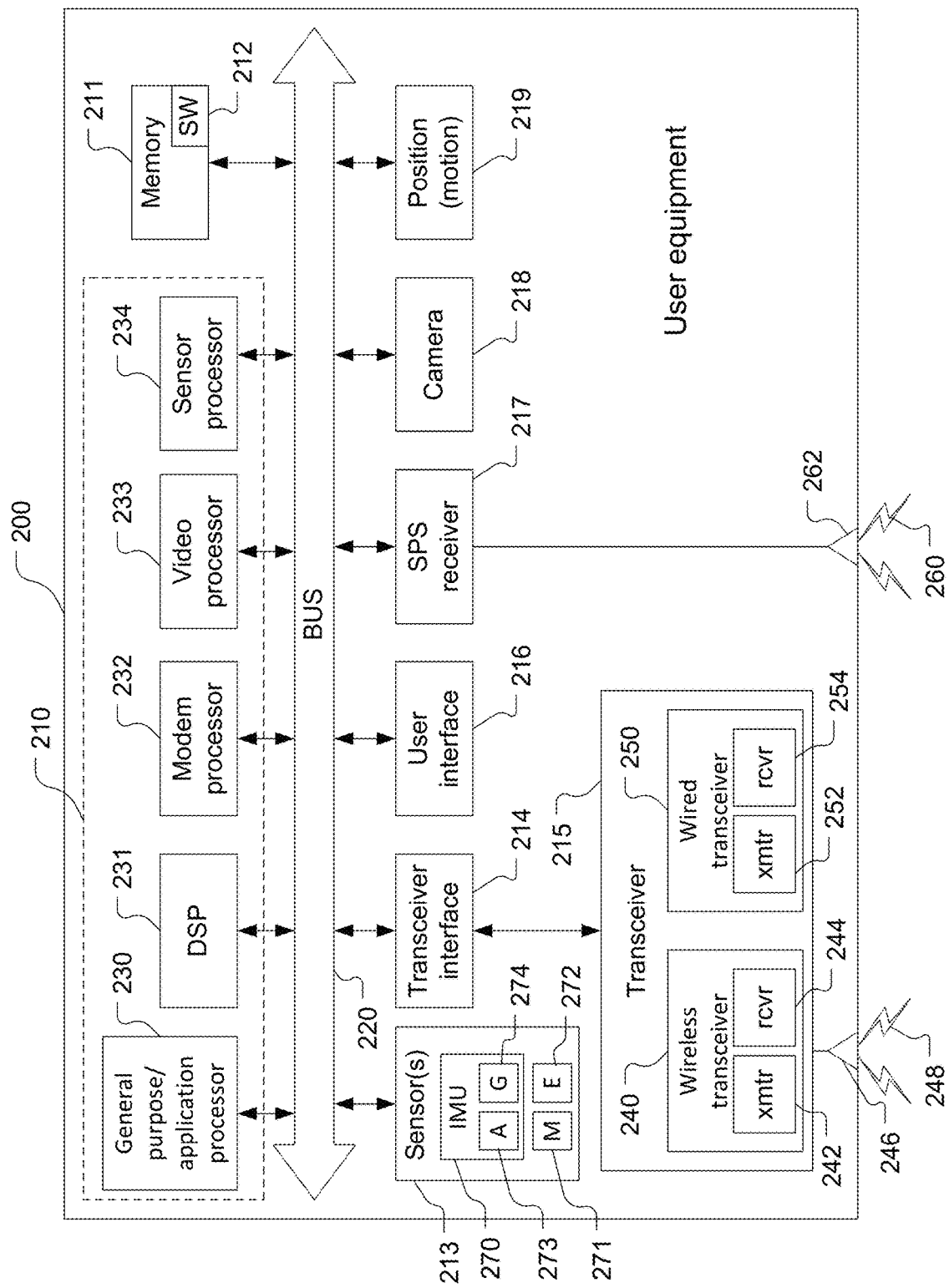
FIG. 2 is a block diagram of components of an example user equipment shown in FIG. 1.

Referring also to FIG. 2, a UE 200 may be an example of one of the UEs 105, 106 and may comprise a computing platform including one or more processors 210, one or more memories 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The one or more processors 210, the one or more memories 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The one or more processors 210 may include one or more intelligent hardware devices, e.g., a central processing unit (CPU), a microcontroller, an application specific integrated circuit (ASIC), etc. The one or more processors 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The one or more memories 211 may be a non-transitory storage medium that may include random access memory (RAM), flash memory, disc memory, and/or read-only memory (ROM), etc. The one or more memories 211 may store the software 212 which may be processor-readable, processor-executable software code containing instructions that may be configured to, when executed, cause the one or more processors 210 to perform various functions described herein. Alternatively, the software 212 may not be directly executable by the one or more processors 210 but may be configured to cause the one or more processors 210, e.g., when compiled and executed, to perform the functions. The description herein may refer to the one or more processors 210 performing a function, but this includes other implementations such as where the one or more processors 210 executes software and/or firmware. The description herein may refer to the one or more processors 210 performing a function as shorthand for one or more of the processors 230-234 performing the function. The description herein may refer to the UE 200 performing a function as shorthand for one or more appropriate components of the UE 200 performing the function. The one or more processors 210 may include one or more memories with stored instructions in addition to and/or instead of the one or more memories 211. Functionality of the one or more processors 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the one or more processors 210, the one or more memories 211, and the wireless transceiver 240. Other example configurations may include one or more of the processors 230-234 of the one or more processors 210, the one or more memories 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the one or more memories 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the one or more processors 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the one or more memories 211 to be processed by DSP 231 and/or the general-purpose/application processor 230 in response to action from a user. Similarly, applications hosted on the UE 200 may store indications of analog and/or digital signals in the one or more memories 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical, or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the one or more memories 211, the DSP 231 and/or one or more specialized processors (not shown) may be utilized to process acquired SPS signals, in whole or in part, and/or to calculate an estimated location of the UE 200, in conjunction with the SPS receiver 217. The one or more memories 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the one or more memories 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the one or more processors 210 and the one or more memories 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the one or more processors 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records,' one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning. i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, and subtracting the $UE_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information—Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred to as an "instance." Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs and the position of the UE 200 based on the ranges to the TRPs and known locations of the TRPs. In UE-assisted RTT, the UE 200 measures positioning signals and provides measurement information to the TRP, and the TRP determines the RTT and range. The TRP provides ranges to a location server, and the server determines the location of the UE 200, e.g., based on ranges to different TRPs. The RTT and/or range may be determined by the TRP that received the signal(s) from the UE 200, by this TRP in combination with one or more other devices, e.g., one or more other TRPs and/or the server, or by one or more devices other than the TRP that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Beamforming

Beamforming is a technique for focusing an RF signal in a specific direction. Traditionally, when a network node (e.g., a base station) broadcasts an RF signal, it broadcasts the signal in all directions (omni-directionally). With beamforming, the network node determines where a given target device (e.g., a UE 200) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Figure 3:
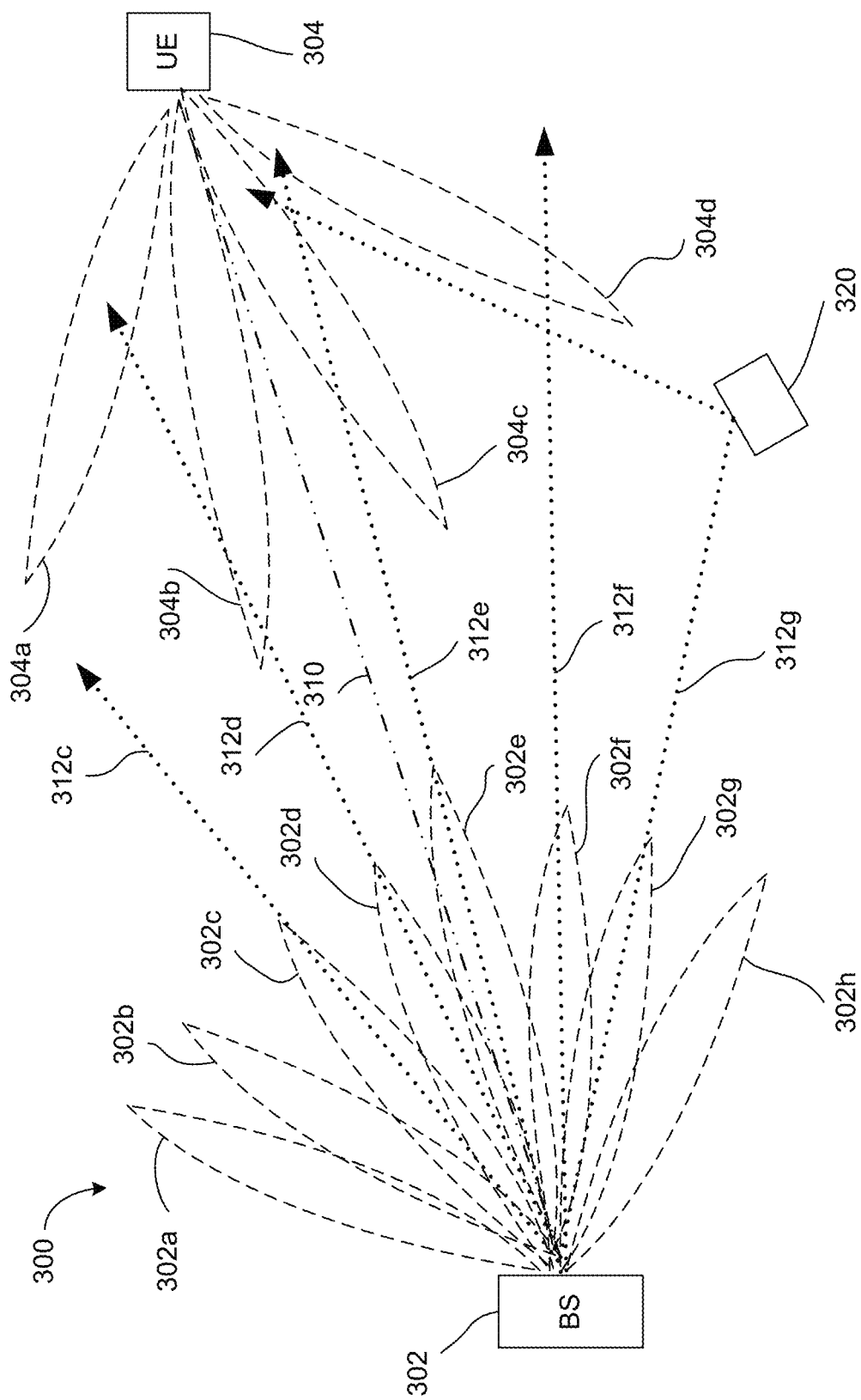
FIG. 3 is a block diagram illustrating an example base station in communication with an example user equipment.

FIG. 3 is a diagram 300 illustrating a base station (BS) 302 (e.g., gNBs 110a, 110b, or eNB 114) in communication with a UE 304 (e.g., UE 200). Referring to FIG. 3, the base station 302 may transmit a beamformed signal to the UE 304 on one or more transmit beams 302a, 302b, 302c, 302d, 302e, 302f, 302g. 302h, each having a beam identifier that can be used by the UE 304 to identify the respective beam. Where the base station 302 is beamforming towards the UE 304 with a single array of antennas (e.g., a single TRP/cell), the base station 302 may perform a "beam sweep" by first transmitting beam 302a, then beam 302b, and so on until lastly transmitting beam 302h. Alternatively, the base station 302 may transmit beams 302a-302h in some pattern or order, such as beam 302a, then beam 302h, then beam 302b, then beam 302g, and so on. Where the base station 302 is beamforming towards the UE 304 using multiple arrays of antennas (e.g., multiple TRPs/cells), each antenna array may perform a beam sweep of a subset of the beams 302a-302h. Alternatively, each of beams 302a-302h may correspond to a single antenna or antenna array.

FIG. 3 further illustrates the paths 312c. 312d, 312e, 312f, and 312g followed by the beamformed signal transmitted on beams 302c, 302d, 302e, 302f, and 302g, respectively. Each path 312c. 312d, 312e, 312f. 312g may correspond to a single "multipath" or, due to the propagation characteristics of radio frequency (RF) signals through the environment, may be comprised of a plurality (a cluster) of "multipaths." Note that although only the paths for beams 302c-302g are shown, this is for simplicity, and the signal transmitted on each of beams 302a-302h will follow some path. In the example shown, the paths 312c. 312d, 312e, and 312f are straight lines, while path 312g reflects off an obstacle 320 (e.g., a building, vehicle, terrain feature, etc.).

The UE 304 may receive the beamformed signal from the base station 302 on one or more receive beams 304a, 304b, 304c, 304d. Note that for simplicity, the beams illustrated in FIG. 3 represent either transmit beams or receive beams, depending on which of the base station 302 and the UE 304 is transmitting and which is receiving. Thus, the UE 304 may also transmit a beamformed signal to the base station 302 on one or more of the beams 304a-304d, and the base station 302 may receive the beamformed signal from the UE 304 on one or more of the beams 302a-302h.

The base station 302 and the UE 304 may perform beam training to align the transmit and receive beams of the base station 302 and the UE 304. For example, depending on environmental conditions and other factors, the base station 302 and the UE 304 may determine that the best transmit and receive beams are 302d and 304b, respectively, or beams 302e and 304c, respectively. The direction of the best transmit beam for the base station 302 may or may not be the same as the direction of the best receive beam, and likewise, the direction of the best receive beam for the UE 304 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 302 may transmit reference signals (e.g., PRS, CRS. TRS, CSI-RS, PSS, SSS, etc.) to the UE 304 on one or more of beams 302a-302h, with each beam having a different transmit angle. The different transmit angles of the beams will result in different received signal strengths (e.g., RSRP, RSRQ, etc.) at the UE 304. Specifically, the received signal strength will be lower for transmit beams 302a-302h that are further from the line of sight (LOS) path 310 between the base station 302 and the UE 304 than for transmit beams 302a-302h that are closer to the LOS path 310.

The UE 304 can report the received signal strength, and optionally, the associated measurement quantity, of each measured transmit beam 302c-302g to the base station 302, or alternatively, the identity of the beam having the highest received signal strength (beam 302e in the example of FIG. 3). Alternatively or additionally, if the UE 304 is also engaged in a round-trip-time (RTT) or time-difference of arrival (TDOA) positioning session with at least one base station 302 or a plurality of base stations 302, respectively, the UE 304 can report reception-to-transmission (Rx-Tx) or reference signal time difference (RSTD) measurements (and optionally the associated measurement quantities), respectively, to the serving base station 302 or other positioning entity. In any case, the positioning entity (e.g., the base station 302, a location server, a third-party client, UE 304, etc.) can estimate the angle from the base station 302 to the UE 304 as the AoD of the transmit beam having the highest received signal strength at the UE 304, here, transmit beam 302c.

To perform an UL-AoA positioning procedure, the UE 304 transmits uplink reference signals (e.g., UL-PRS, SRS, DMRS, etc.) to the base station 302 on one or more of uplink receive beams 304a, 304b, 304c, 304d. The base station 302 receives the uplink reference signals on one or more of uplink receive beams 302a-302h. The base station 302 determines the angle of the best receive beams 302a-302h used to receive the one or more reference signals from the UE 304 as the AoA from itself to the UE 304. Specifically, each of the receive beams 302a-302h will result in a different received signal strength (e.g., RSRP, RSRQ, etc.) of the one or more reference signals at the base station 302. Further, the channel impulse response of the one or more reference signals will be smaller for receive beams 302a-302h that are further from the actual LOS path between the base station 302 and the UE 304 than for receive beams 302a-302h that are closer to the LOS path. Likewise, the received signal strength will be lower for receive beams 302a-302h that are further from the LOS path than for beams receive 302a-302h that are closer to the LOS path. As such, the base station 302 identifies the receive beam 302a-302h that results in the highest received signal strength and, optionally, the strongest channel impulse response, and estimates the angle from itself to the UE 304 as the AoA of that beam 302a-302h. Note that as with DL-AoD-based positioning, the AoA of the beam 302a-302h resulting in the highest received signal strength (and strongest channel impulse response if measured) does not necessarily lie along the LOS path 310. However, for UL-AoA-based positioning purposes, it is assumed to do so.

Where the UE 304 is estimating its location (i.e., the UE is the positioning entity), it needs to obtain the geographic location of the base station 302. The UE 304 may obtain the location from, for example, the base station 302 itself or a location server (e.g., location server 150, LMF 120). With the knowledge of the distance to the base station 302 (based on the RTT or timing advance), the angle between the base station 302 and the UE 304 (based on the UL-AoA of the best beam 302a-302h), and the known geographic location of the base station 302, the UE 304 can estimate its location.

Alternatively, where a positioning entity, such as the base station 302 or a location server, is estimating the location of the UE 304, the base station 302 reports the AoA of the beam 302a-302h resulting in the highest received signal strength (and optionally strongest channel impulse response) of the reference signals received from the UE 304, or all received signal strengths and channel impulse responses for all receive beams 302 (which allows the positioning entity to determine the best beam 302a-302h). The base station 302 may additionally report the distance to the UE 304. The positioning entity can then estimate the location of the UE 304 based on the UE's 304 distance to the base station 302, the AoA of the identified beam 302a-302h, and the known geographic location of the base station 302.

Figure 4A:
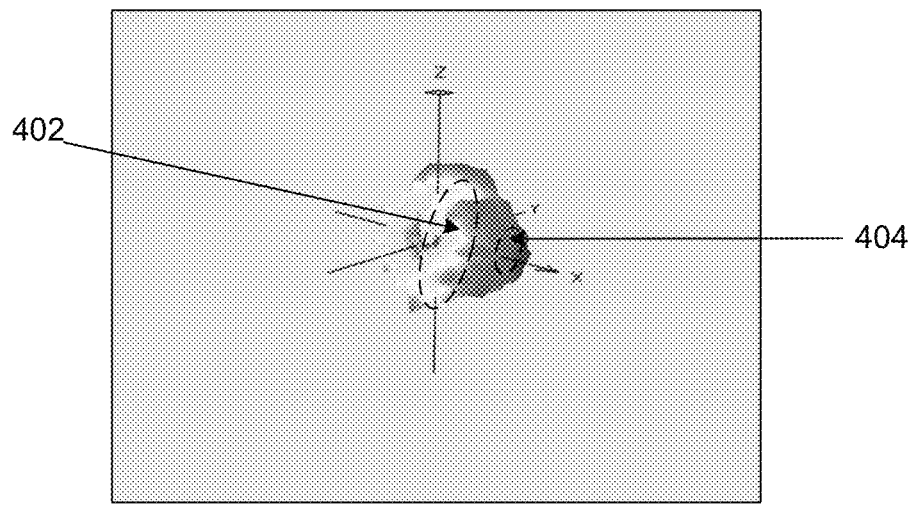
FIG. 4A is a diagram of an example beam shape.
Figure 4B:
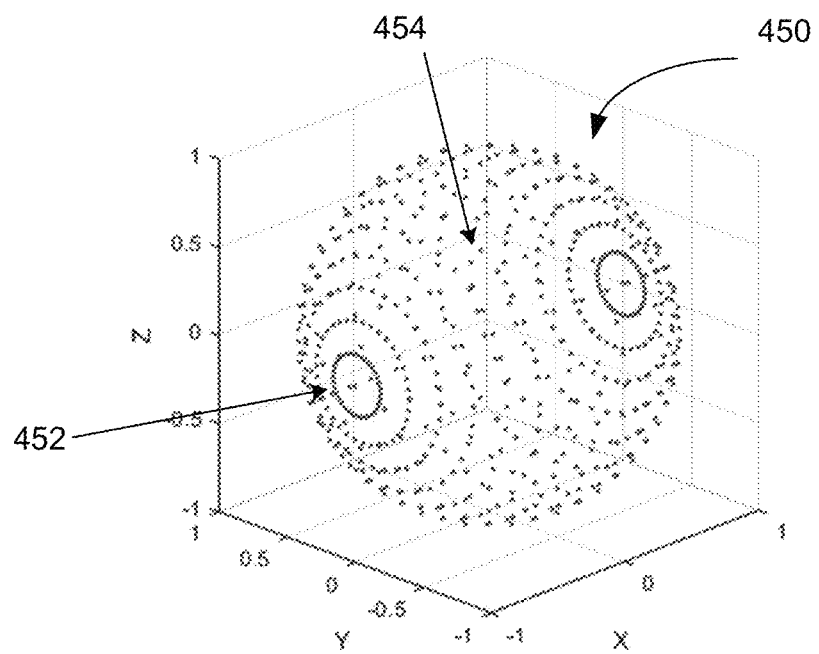
FIG. 4B is a diagram of a sampling grid of beam sampling directions mapped onto a unit sphere.

One technique to sample beams transmitted by a network device (e.g., BS 302 or UE 304) may include equal angle spacing between sampling directions, where sampling occurs at uniform linear angles in azimuth and elevation. Beam shapes transmitted by the network node may be irregular, as illustrated in FIG. 4A, where the beam shape may include areas (e.g., area 402) where the beam gain varies more than at other areas (e.g., area 404). FIG. 4B is a diagram of a sampling grid of beam sampling directions mapped onto a unit sphere 450. The directions are represented by specific points from the center of the sphere 450. As illustrated in FIG. 4B, the sampling of the irregular beam shape using equal angle spacing leads to a non-uniform sampling grid, with a higher concentration or density of samples at the polar directions 452 and lower concentration or density of samples at the equator directions 454. The sampling of the beams may be more robust in some directions than others, which may result in an uneven representation of the beam shape.

Beam Patterns

In one embodiment, to assist in obtaining a more uniform representation of the beam shape, a beam pattern of the network device (e.g., BS 302 or UE 304) may be defined by a manufacturer of the network device using a sampling method with a uniform distribution of sampling directions. A uniform distribution of sampling directions, as used herein, refers to a distribution where each direction has the same statistical likelihood of being sampled. For example, the manufacturer may place the network device in an antenna chamber and sample the beam gains for each beam transmitted by the antennas of the network device using the uniform distribution of sampling directions. The beam pattern defined using the uniform distribution of sampling directions may be provided to another network device for use in the field, as described further below. Multiple sampling methods may be agreed upon between the manufacturer of the network device and a network provider. The manufacturer may sample the beams transmitted by the antennas of the network device using each sampling method, and a beam pattern corresponding to each sampling method may be defined. The manufacturer may also define beam patterns of the network device using the same sampling method but with multiple resolutions, i.e., direction densities. Another network device may request a beam pattern associated with a specific sampling method and/or a specific resolution. A network device that provides the beam pattern is referred to herein as a "beam pattern reporting device." A network device that requests the beam pattern is referred to herein as a "beam pattern processing device." The "beam pattern reporting device" or the "beam pattern processing device" may each comprise a single device or multiple devices. For example, the BS 302 may be the beam pattern reporting device, and the UE 304 may be the beam pattern processing device 600. directions.

Figure 5:
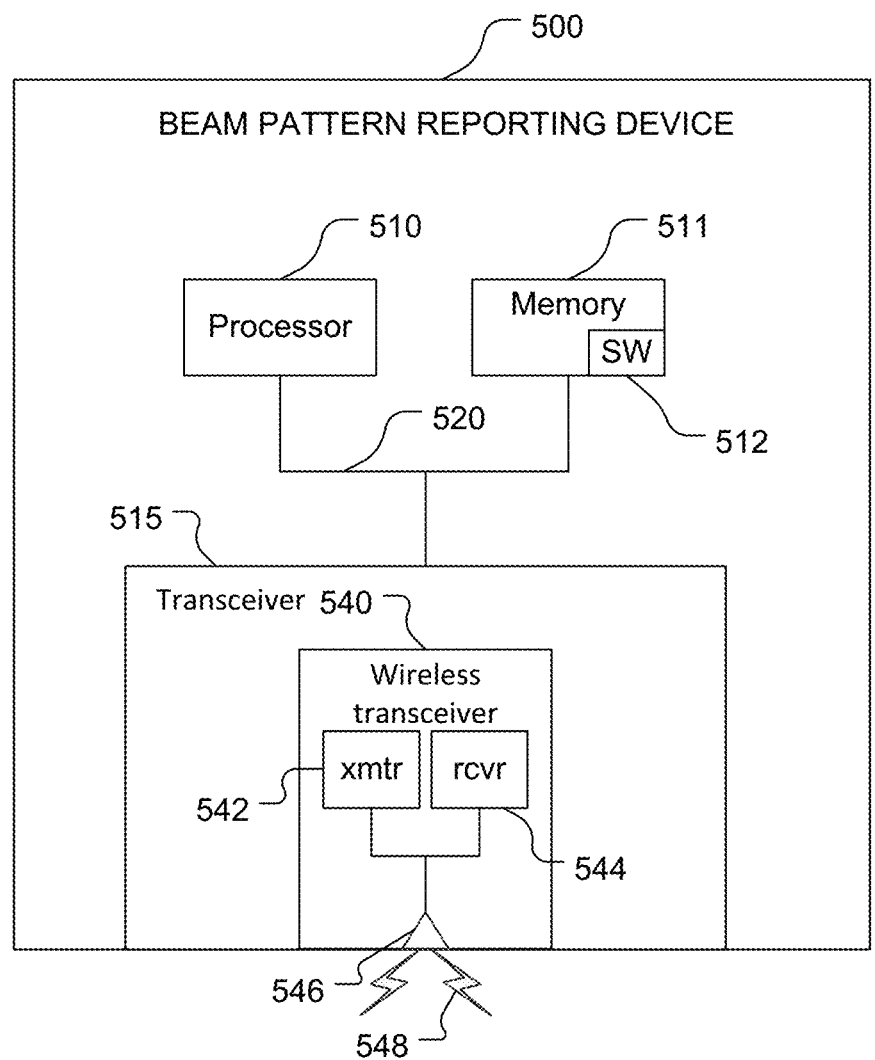
FIG. 5 is a simplified block diagram of an example beam pattern reporting device.

Referring to FIG. 5, an example beam pattern reporting device 500 comprises a computing platform including one or more processors 510, one or more memories 511 including software (SW) 512, and a transceiver 515. The one or more processors 510, the one or more memories 511, and the transceiver 515 may be communicatively coupled to each other by a bus 520 (which may be configured, e.g., for optical and/or electrical communication). The one or more processors 510 may include one or more intelligent hardware devices, e.g., a central processing unit (CPU), a microcontroller, an application specific integrated circuit (ASIC), etc. The one or more processors 510 may comprise multiple processors (e.g., including a general-purpose/application processor, a DSP, a modem processor, a video processor, and/or a sensor processor as shown in FIG. 2). The one or more memories 511 may be a non-transitory storage medium that may include random access memory (RAM)), flash memory, disc memory, and/or read-only memory (ROM), etc. The one or more memories 511 may store the software 512 which may be processor-readable, processor-executable software code containing instructions that are configured to, when executed, cause the one or more processors 510 to perform various functions described herein. Alternatively, the software 512 may not be directly executable by the one or more processors 510 but may be configured to cause the one or more processors 510, e.g., when compiled and executed, to perform the functions.

The description herein may refer to the one or more processors 510 performing a function, but this includes other implementations such as where the one or more processors 510 executes software and/or firmware. The description herein may refer to the one or more processors 510 performing a function as shorthand for one or more of the processors contained in the one or more processors 510 performing the function. The description herein may refer to the beam pattern reporting node 500 performing a function as shorthand for one or more appropriate components (e.g., the one or more processors 510 and the one or more memories 511) of the beam pattern reporting node 500 performing the function. The one or more processors 510 may include one or more memories with stored instructions in addition to and/or instead of the one or more memories 511. Functionality of the one or more processors 510 is discussed more fully below.

The transceiver 515 may include a wireless transceiver 540 configured to communicate with other devices through wireless connections. For example, the wireless transceiver coupled to one or more antennas 546 for transmitting (e.g., on one or more uplink channels and/or one or more downlink channels) and/or receiving (e.g., on one or more downlink channels and/or one or more uplink channels) wireless signals 548 and transducing signals from the wireless signals 548 to wired (e.g., electrical and/or optical) signals and from wired (e.g., electrical and/or optical) signals to the wireless signals 548. Thus, the wireless transmitter 542 may include multiple transmitters that may be discrete components or combined/integrated components, and/or the wireless receiver 544 may include multiple receivers that may be discrete components or combined/integrated components. The wireless transceiver 540 may be configured to communicate signals (e.g., with the UE 304, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc.

The configuration of the beam pattern reporting device 500 shown in FIG. 5 is an example and not limiting of the disclosure, including the claims, and other configurations may be used. For example, the description herein discusses that the beam pattern reporting device 500 may be configured to perform or performs several functions of the BS 302, but one or more of these functions may be performed by the LMF 120 and/or the UE 304 (i.e., the LMF 120 and/or the UE 304 may be configured to perform one or more of these functions).

Figure 6:
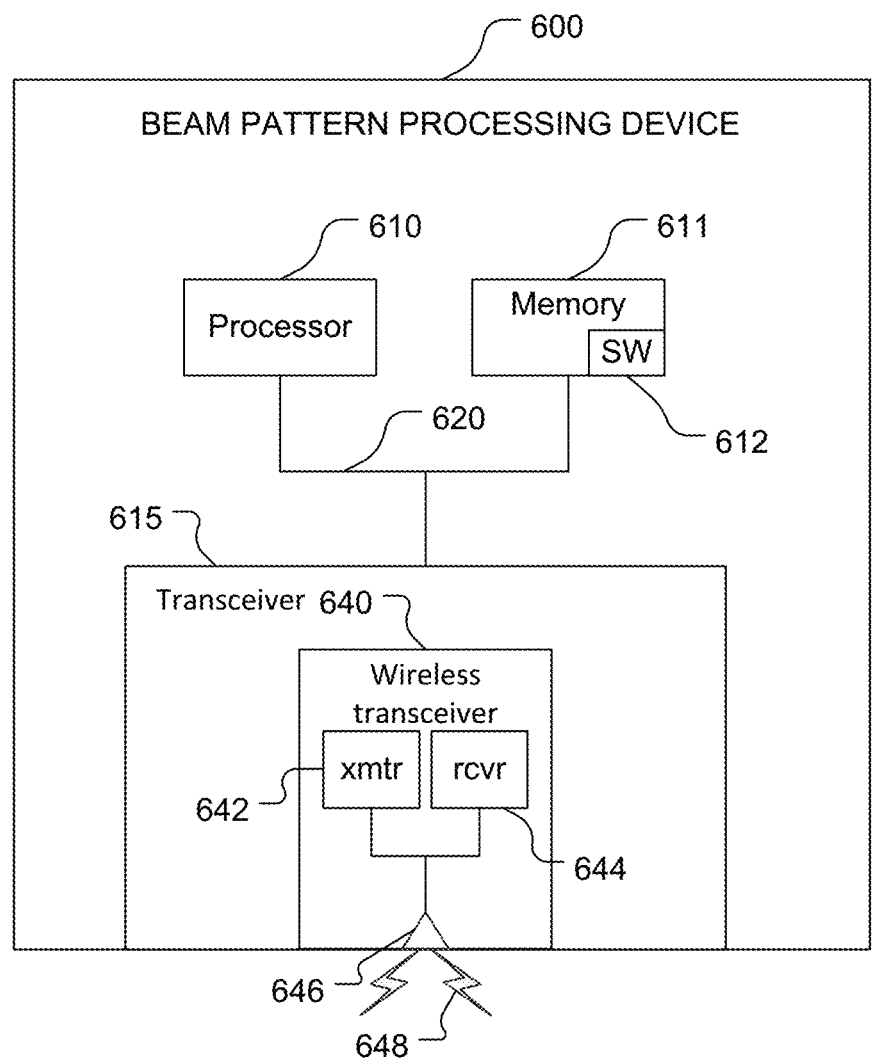
FIG. 6 is a simplified block diagram of an example beam pattern processing device.

Referring to FIG. 6, a beam pattern processing device 600 includes one or more processors 610, a transceiver 615, and one or more memories 611, including software (SW) 612, communicatively coupled to each other by a bus 620. The transceiver 615 may include one or more transceivers (e.g., one or more transmitters and/or one or more receivers), and the one or more memories 611 may include one or more memories. The UE 600 may include the components shown in FIG. 6. The beam pattern processing node 600 may include one or more other components such as any of those shown in FIG. 2 such that the UE 200 may be an example of the beam pattern processing node 600. For example, the one or more processors 610 may include one or more of the components of the one or more processors 610. The transceiver 615 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. The one or more memories 611 may be configured similarly to the one or more memories 211, e.g., including software with processor-readable instructions configured to cause the one or more processors 610 to perform functions.

The transceiver 615 may include a wireless transceiver 640 configured to communicate with other devices through wireless connections. For example, the wireless transceiver coupled to one or more antennas 646 for transmitting (e.g., on one or more uplink channels and/or one or more downlink channels) and/or receiving (e.g., on one or more downlink channels and/or one or more uplink channels) wireless signals 648 and transducing signals from the wireless signals 648 to wired (e.g., electrical and/or optical) signals and from wired (e.g., electrical and/or optical) signals to the wireless signals 648. Thus, the wireless transmitter 642 may include multiple transmitters that may be discrete components or combined/integrated components, and/or the wireless receiver 644 may include multiple receivers that may be discrete components or combined/integrated components.

The description herein may refer to the one or more processors 610 performing a function, but this includes other implementations such as where the one or more processors 610 executes software (stored in the one or more memories 611) and/or firmware. The description herein may refer to the beam pattern processing device 600 performing a function as shorthand for one or more appropriate components (e.g., the one or more processors 610 and the one or more memories 611) of the beam pattern processing node 600 performing the function.

Figure 8:
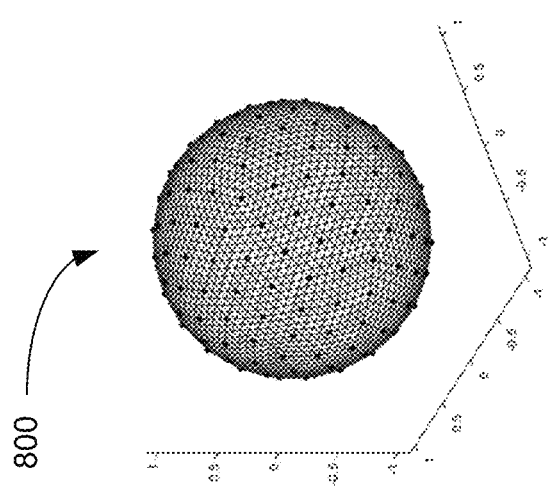
FIG. 8 is a diagram of a sampling grid with the uniform distribution of sampling directions of FIG. 7 with more sampling directions.
Figure 7:
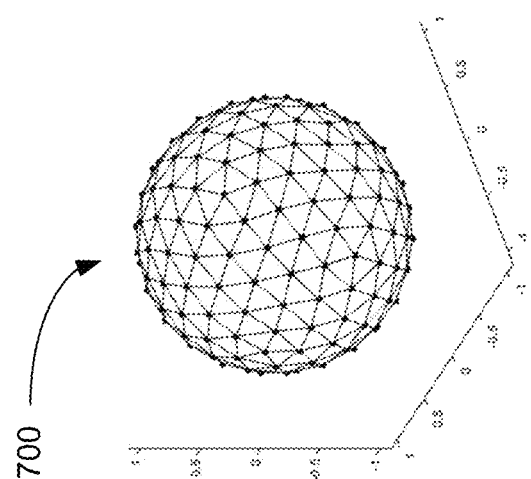
FIG. 7 is a diagram of a sampling grid with a uniform distribution of sampling directions mapped onto a unit sphere.

Referring to FIG. 7, in one embodiment, a spherical sampling grid with a uniform distribution of sampling directions may be used to sample beams transmitted by the antennas of a network device. The spherical sampling grid 700 shows a sampling grid with the uniform distribution of directions represented by or mapped onto a unit sphere. A technique, such as a cuboid subdivision based spiral sampling, may provide the uniform distribution of sampling directions. The cuboid subdivision based spiral sampling may be applied repeatedly to obtain increasingly more directions. For example, referring to FIG. 8, a spherical sampling grid 800 representing more sampling directions than the spherical sampling grid 700 may be realized by applying more iterations of the cuboid subdivision based spiral sampling. For each sampling direction represented on the spherical sampling grid 700, 800, the beam gains at one or more arbitrary directions may be obtained.

Figure 9:
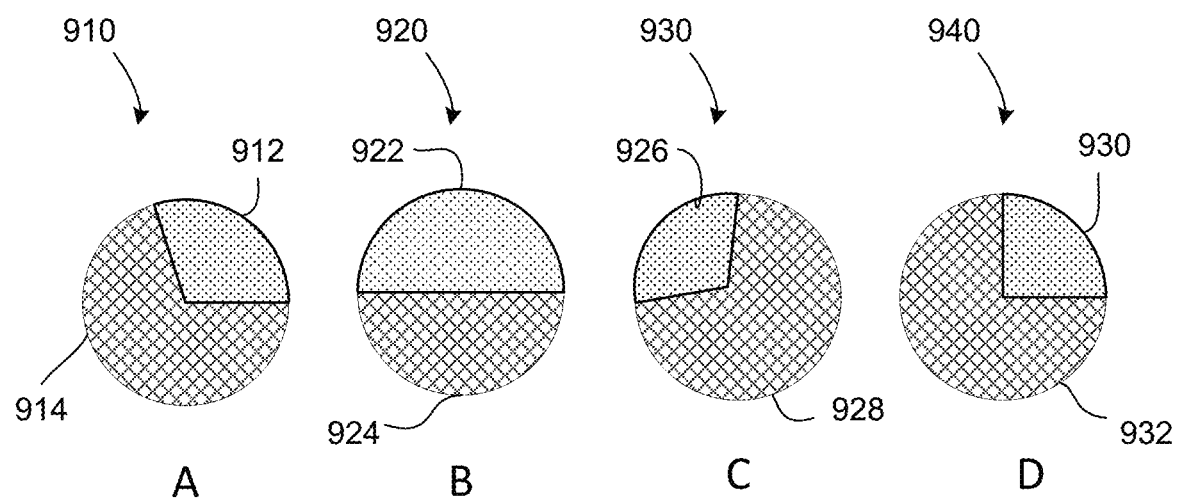
FIG. 9 are diagrams of example segmenting methods applicable to a beam pattern.

Referring to FIG. 9, one of a plurality of segmenting methods A, B, C, D may be applied to a spherical sampling grid to define regions of the spherical sampling grid based on variations or variances in the beam gains of a beam. Although FIG. 9 shows two-dimensional circles, each two-dimensional circle represents a three-dimensional spherical sampling grid. For example, variations of beam gains may be calculated, and one or more regions of the spherical sampling grid may be defined, such that directions with a certain range of variations are grouped together into a region. In another example, variances of the beam gains may be calculated, and one or more regions of the sphere may be defined, such that directions with a certain range of variances are grouped together into a region. Referring again to FIG. 4A, one region may contain directions associated with the area 402, while another region may contain directions associated with the area 404. In example segmenting method A, a first region 912 that comprises an upper right one-third (⅓) of the spherical sampling grid 910 and a second region 914 that comprises the remaining two-thirds (⅔) of the spherical sampling grid 910 may be defined. In example segmenting method B, a first region 922 that comprises an upper one-half (½) of the spherical sampling grid 920 and a second region 924 that comprises the lower half of the spherical sampling grid 920 may be defined. In example segmenting method C, a first region 926 that comprises an upper left one-third (⅓) of the spherical sampling grid 930 and a second region 928 that comprises the remaining two-thirds (⅔) of the spherical sampling grid 930 may be defined. In example segmenting method D, a first region 930 that comprises one-fourth (¼) of the spherical sampling grid 940 in the upper right and a second region 932 that comprises the remaining three-fourth (¾) of the spherical sampling grid 940 may be defined. Although FIG. 9 illustrates example segmenting methods that define two regions of a spherical sampling grid, segmenting methods that define a single region that comprises the entire spherical sampling grid or more than two regions may be used. The regions may also have irregular shapes.

Figure 10:
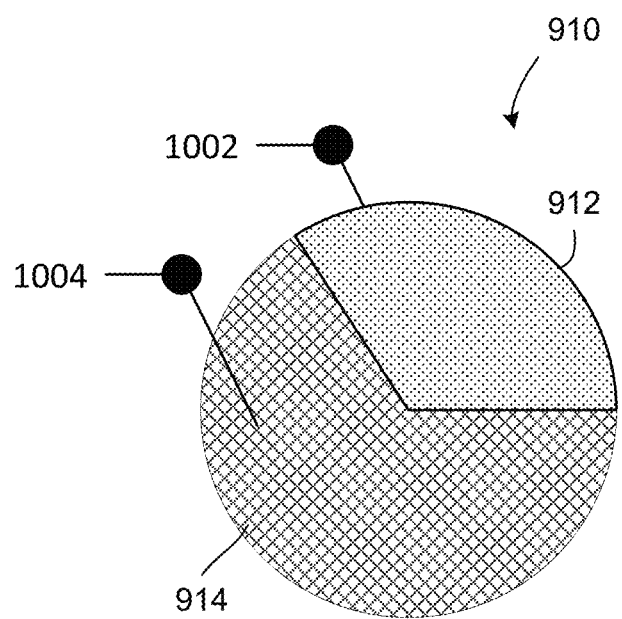
FIG. 10 is a diagram of an example segmenting method and example sampling direction densities.

Referring to FIG. 10, different sampling direction densities may be associated with different regions of the spherical sampling grid. For example, for spherical sampling grid 910, the first region 912 may comprise directions with a higher variations or variances in the beam gains compared to the variations or variances in the beam gains in the directions in the second region 914. A first sampling direction density 1002 may be applied to the first region 912, and a second sampling direction density 1004 may be applied to the second region 914, where the first sampling direction density 1002 comprises a higher granularity of directions (i.e., denser directions) than the second sampling direction density 1004.

The sampling methods, the segmenting methods, and the sampling direction densities may be used by the beam pattern reporting device 500 to obtain a sampled beam pattern, which applies the segmenting methods and sampling direction densities to a beam pattern defined using the sampling method. The beam pattern processing device 600 uses the sampled beam pattern to obtain beam gains in arbitrary directions for use in different applications. For example, the beam gains may be used in the AoA or AoD positioning methods, described above By using a sampled beam pattern with more samples may be obtained in the directions of the sampling grid with higher rates of variations or variances of the beam gains than in the directions of the sampling grid with lower rates of variations or variances of the beam gains. For example, referring again to FIG. 10, more measurements may be obtained in the directions in the first region 912 than in the directions in the second region 914.

The sampling method used to define the beam pattern of the beam pattern reporting node 500 may be agreed upon between manufacturer and network provider. The manufacturer and the network provider may agree upon a single sampling method or multiple sampling methods. The beam patterns may be stored at the beam pattern reporting device 500 or at another network entity and provided to the beam pattern reporting device 500 upon request. When multiple sampling methods are agreed upon, the manufacturer may sample the beams transmitted by the antennas of the beam pattern reporting device 500 using each sampling method, and a beam pattern corresponding to each sampling method may be defined. The manufacturer may also define beam patterns of the beam pattern reporting node 500 using the same sampling method but with multiple resolutions, i.e., direction densities. A beam pattern processing device 600 may request a beam pattern associated with a specific sampling method and/or a specific resolution and request that a specific segmenting method and sampling direction densities be applied. The beam pattern reporting device 500 may respond by applying the specific segmenting method and sampling direction densities to the beam pattern associated with the specific sampling method and may provide a sampled version of the requested beam pattern.

Figure 11:
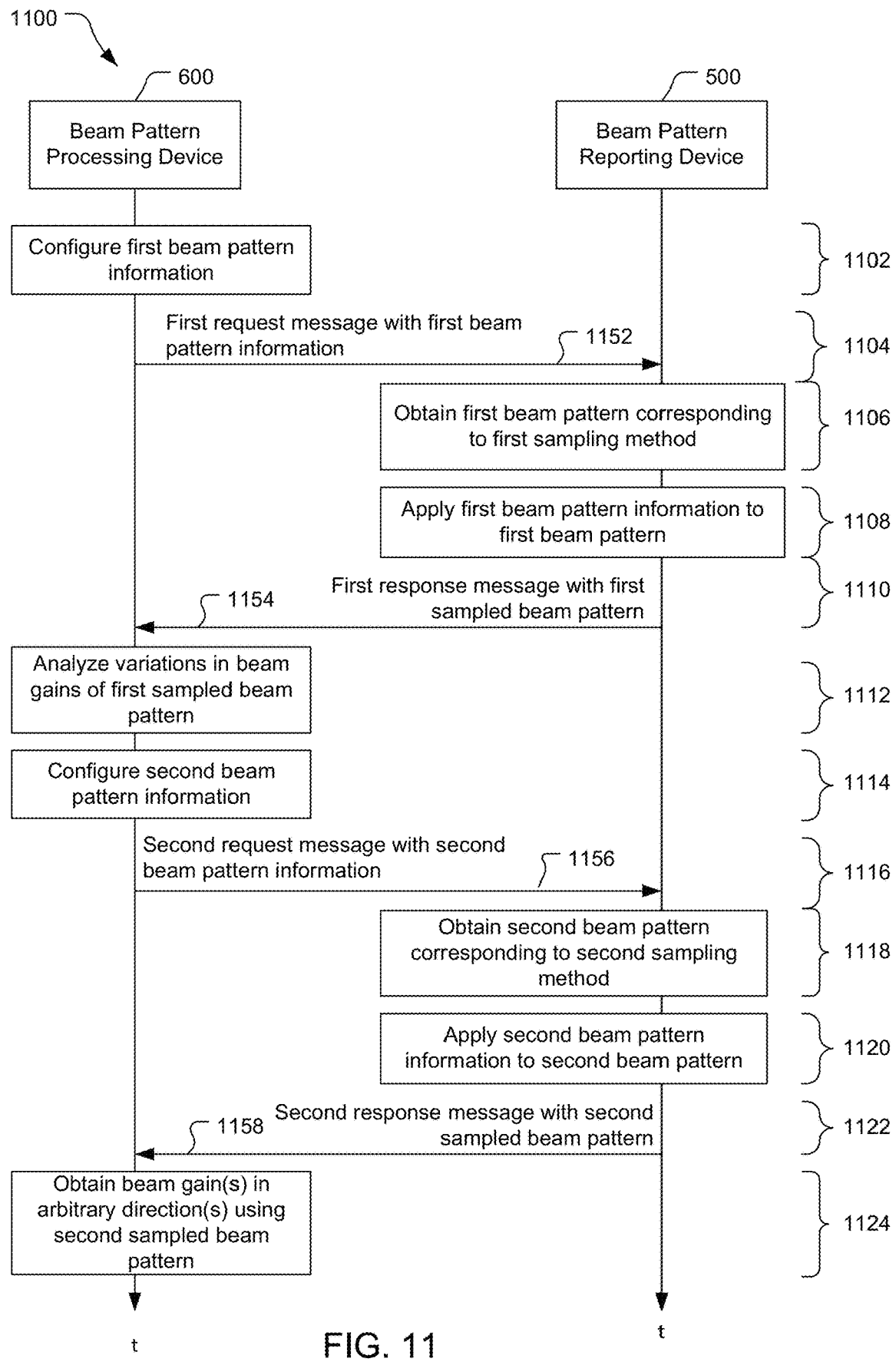
FIG. 11 is an example message flow for providing a beam pattern of a network device.

Referring to FIG. 11, a signal and processing flow 1100 for providing a beam pattern of a beam pattern reporting device 500 includes the stages shown. The flow 1100 is an example flow and not limiting. The flow 1100 may be altered, e.g., by having one or more messages and/or one or more stages added, removed, rearranged, combined, performed concurrently, and/or having one or more messages and/or one or more stages split into multiple messages and/or stages. At an initial stage, the beam pattern processing device 600 may not have initial information concerning the beam pattern of the beam pattern reporting device 500 upon which to select a segmenting method or sampling direction densities. To obtain the initial information, at stage 1102, the beam pattern processing device 600 may configure a first (i.e., initial) beam pattern information that may include a first sampling method (e.g., uniform distribution of sampling directions), a first segmenting method, and first sampling direction densities. For example, the beam pattern processing device 600 may select the first sampling method from multiple sampling methods agreed upon between the manufacturer of the beam pattern reporting device 500 and the network provider. At stage 1104, the beam pattern processing device 600 may send, to the beam pattern reporting device 500, a first request message 1152 with the first beam pattern information for a first sampled beam pattern of the beam pattern reporting device 500 with a first resolution. At stage 1106, in response to the first request message 1152, the beam pattern reporting device 500 may obtain a first beam pattern corresponding to the first sampling method. At stage 1108, the beam pattern reporting device 500 may apply the first beam pattern information to the first beam pattern. For example, the beam pattern reporting device 500 may obtain a first spherical sampling grid for the first beam pattern, defined by the first sampling method, and define one or more regions in the first spherical sampling grid based on the first segmenting method. To obtain a first sampled beam pattern, the beam pattern reporting device 500 may sample the first beam pattern in the directions in each region using the first sampling direction densities associated with each region of the first spherical sampling grid. At stage 1110, the beam pattern reporting device 500 may send a first response message 1154 that comprises the first sampled beam pattern of the beam pattern reporting device 500. At stage 1112, in response to receiving the first sampled beam pattern, the beam pattern processing device 600 may analyze the variations in the beam gains of the first sampled beam pattern. At stage 1114, the beam pattern processing device 600 may configure a second beam pattern information based on the variations. The second beam pattern information may include a second sampling method (e.g., uniform distribution of sampling directions), a second segmenting method, and second sampling direction densities. When multiple beam patterns have been generated by the manufacturer of the beam pattern reporting device 500 using multiple sampling methods, the beam pattern processing device 600 may select a specific sampling method to include in the second sampling method based on the requirements of the application for which beam gains will be obtained. In this manner, the second sampling method may be configurable. For example, the beam pattern processing device 600 may select the second sampling method from multiple sampling methods agreed upon between the manufacturer of the beam pattern reporting node 500 and the network provider. The multiple sampling methods from which the second sampling method may be selected may be the same or different from the multiple sampling methods from which the first sampling method may be selected. At stage 1116, the beam pattern processing device 600 may send, to the beam pattern reporting device 500, a second request message 1156 that may include the second beam pattern information for a second sampled beam pattern of the beam pattern reporting device 500 with a second resolution. To save network overhead in obtaining the initial information, the first resolution of the first sampled beam pattern may be a lower resolution than the second resolution of the second sampled beam pattern, i.e., the second sampled beam pattern contains denser directions than the first sampled beam pattern. At stage 1118, in response to the second request message 1156, the beam pattern reporting device 500 may obtain a second beam pattern corresponding to the second sampling method. At stage 1120, the beam pattern reporting device 500 may apply the second beam pattern information to the second beam pattern. For example, the beam pattern reporting device 500 may obtain a second spherical sampling grid for the second beam pattern, defined by the second sampling method and define one or more regions in the second spherical sampling grid based on the second segmenting method. The beam pattern reporting device 500 may sample the second beam pattern using the second sampling direction densities associated with each region of the second spherical sampling grid to obtain a second sampled beam pattern. At stage 1122, the beam pattern reporting device 500 may send, to the beam pattern processing device 600, a second response message 1158 that comprises the second sampled beam pattern of the beam pattern reporting device 500. At stage 1124, in response to receiving second sampled beam pattern, the beam pattern processing device 600 may obtain one or more beam gains in one or more arbitrary directions using the second sampled beam pattern. Alternatively, the second segmenting method and the second sampling direction densities to be applied to the second beam pattern of the beam pattern reporting node 500 may be predetermined (e.g., agreed upon between the manufacturer of the beam pattern reporting device 500 and the network provider), such that stages 1102 through 1114 may not be performed.

Figure 12A:
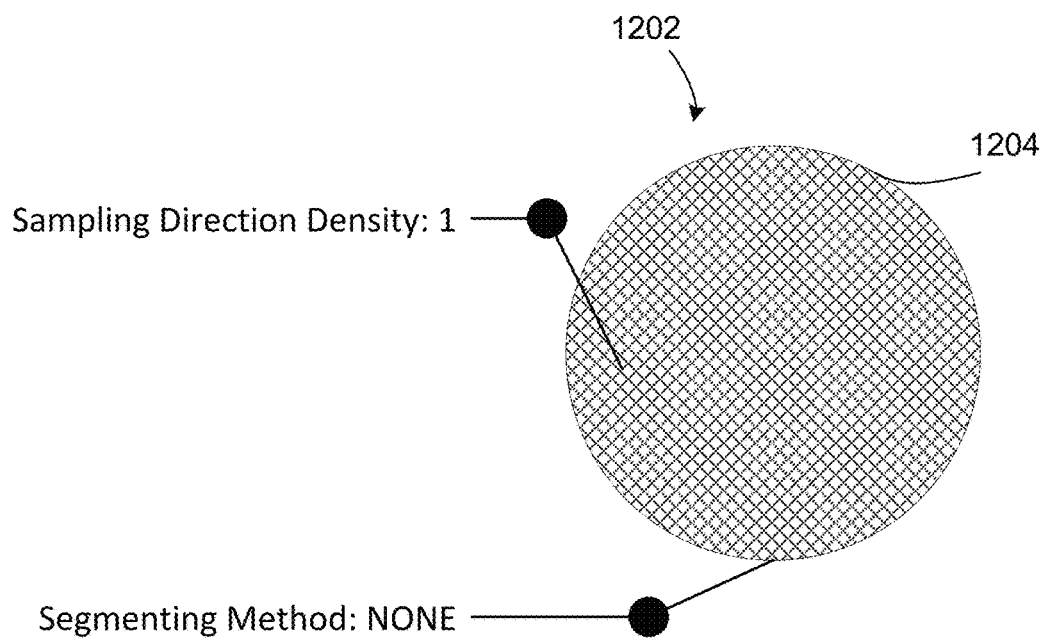
FIG. 12A is a diagram of an example segmenting method and sampling direction densities applied to a beam pattern.
Figure 12B:
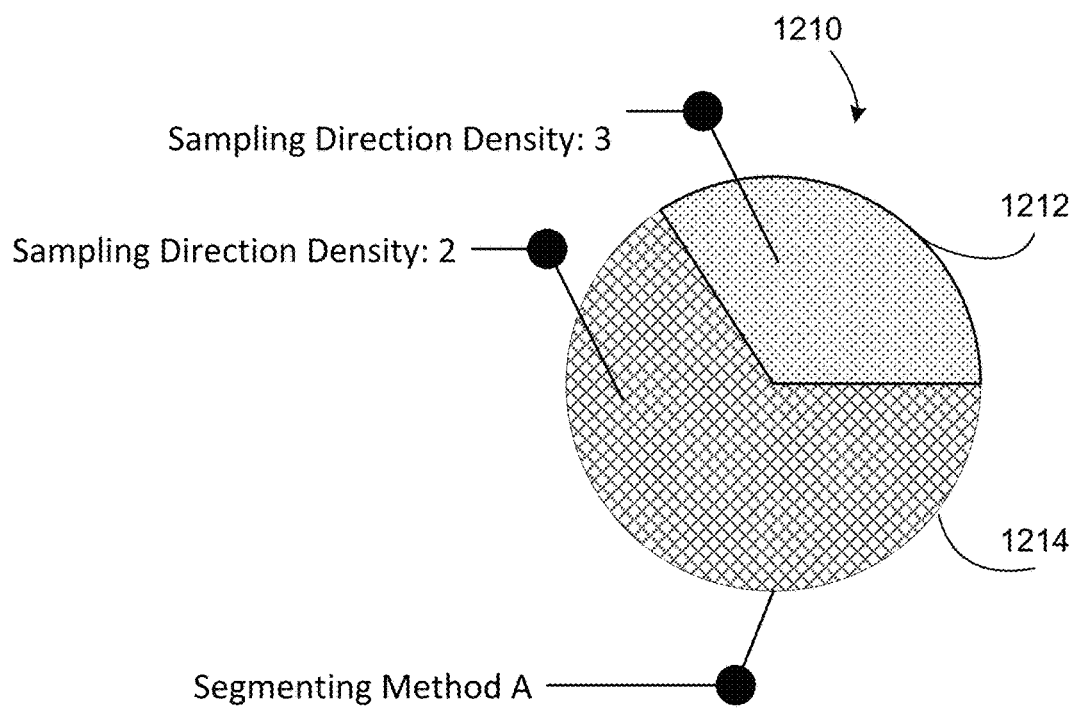
FIG. 12B is a diagram of another example segmenting method and sampling direction densities applied to a beam pattern.

For example, the UE 304 may be the beam pattern processing device 600, and the BS 302 may be the beam pattern reporting device 500. The BS 302 may store the beam patterns of the BS 302 or may request the beam pattern of the BS 302 from another network entity. At stage 1102, the UE 304 may configure a first beam pattern information by selecting the first sampling method, the first segmenting method, and the first sampling direction densities. For example, referring to FIG. 12A, the spherical sampling grid 1202 may have been used by the manufacturer of the BS 302 to obtain the first beam pattern of the BS 302, defined using a cuboid subdivision based spiral sampling. The UE 304 may select cuboid subdivision as the first sampling method, which defines a spherical sampling grid with a uniform distribution of sampling directions, e.g., spherical sampling grid 1202. The UE 304 may further select the first segmenting method of "NONE", i.e., defining a single region 1204 that comprises the entire spherical sampling grid 1202. The UE 304 may further select the first sampling direction density of "1" for the single region 1204. At stage 1104, the UE 304 may send, to the BS 302, a first request message 1152 with the first beam pattern information for a first sampled beam pattern of the BS 302 with a first resolution. At stage 1106, in response to the first request message 1152, the BS 302 may obtain a first beam pattern corresponding to the first sampling method of cuboid subdivision. At stage 1108, the BS 302 may applying the segmenting method of "NONE" to the first beam pattern, which may define a single region 120 that includes the entire spherical sampling grid as a single region and may associate the sampling direction density of "1" to the entire spherical sampling grid 1202. The BS 302 may sample the first beam pattern using the sampling direction density of "1" applied to the entire spherical sampling grid to obtain the first sampled beam pattern. At stage 1110, the BS 302 may send, to the UE 304, a first response message 1154 with the first sampled beam pattern. At stage 1112, in response to receiving the first sampled beam pattern, the UE 304 may analyze the variations in the beam gains of the first sampled beam pattern. At stage 1114, the UE 304 configures a second beam pattern information based on the variations and to include a second sampling method, a second segmenting method, and second sampling direction densities for the second beam pattern information. For example, the BS 302 may ascertain the areas of the spherical sampling grid which contains the directions in which the rates of variations or variances of the beam gains are higher than in other areas on the spherical sampling grid. The UE 304 may select the second segmenting method which would define one or more regions, such that areas with higher rates of variations or variances reside in the same region, while areas with lower rates of variations or variances reside in another region. For example, multiple segmenting methods may be predefined, and the UE 304 may select the segmenting method that most closely defines regions that group directions in the above described manner. The UE 304 may select the second sampling direction densities for the regions defined by the second segmenting method. For example, referring to FIG. 12B, the spherical sampling grid 1210, defined by a cuboid subdivision based spiral sampling method, may be selected as the second segmenting method. Sampling direction density "3" may be selected for region 1212, and sampling direction density "2" may be selected for region 1214, when the rates of variations or variances in the beam gains are higher in the directions in region 1212 than in the directions in region 1214. At stage 1116, the UE 304 may send, to the BS 302, the second request message 1156 that may include the second beam pattern information for the second sampled beam pattern of the BS 302 with a second resolution, where the first resolution is lower than the second resolution. At stage 1118, the BS 302 may respond by obtaining a second beam pattern corresponding to the second sampling method. At stage 1120, the BS 302 may apply the second segmenting method to the spherical sampling grid 1210, which defines region 1212 and region 1214. The sampling direction density of "2" may be applied to region 1214, and a sampling direction density of "3" may be applied to region 1212, according to the second sampling direction densities. At stage 1122, the BS 302 may send a second response message 1158 with the second sampled beam pattern to the UE 304. At stage 1124, the UE 304 may use the second sampled beam pattern to obtain one or more beam gains in one or more arbitrary directions, for use by one or more applications at the UE 304.

Figure 13:
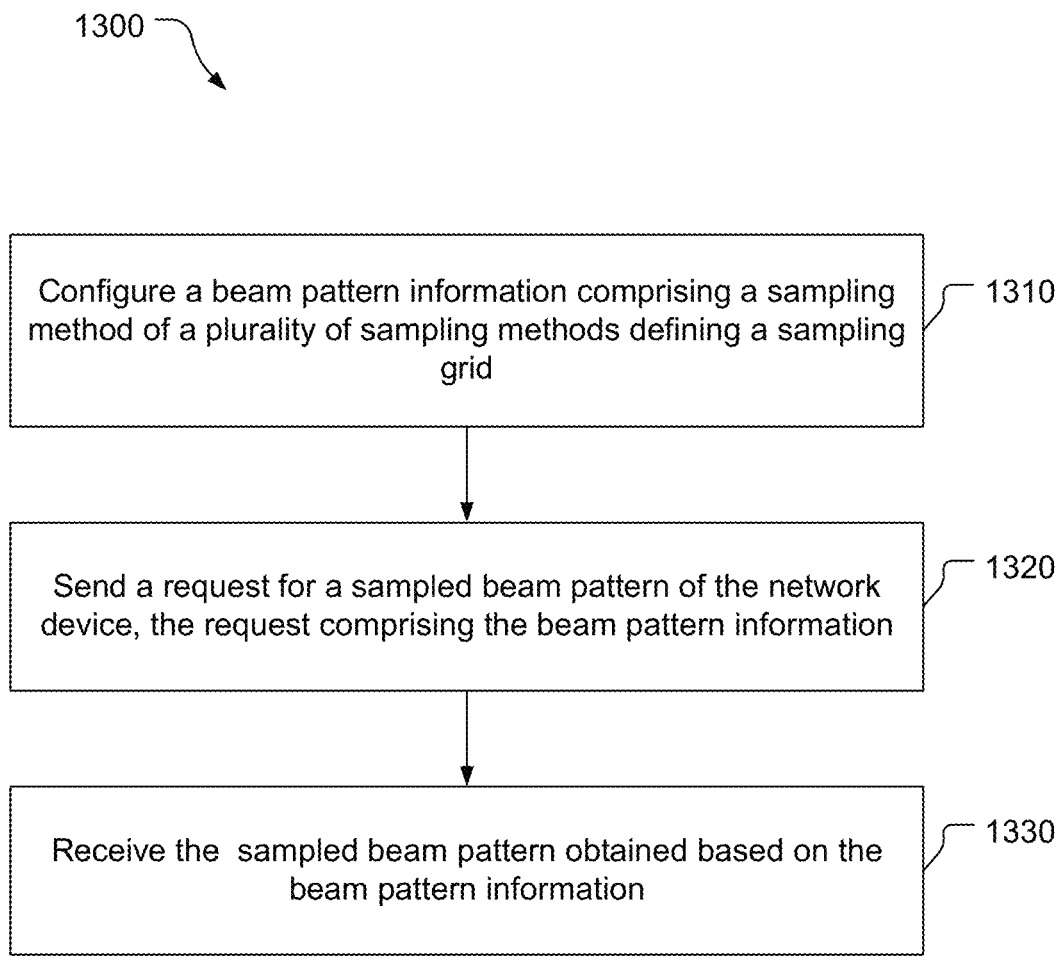
FIG. 13 is a block flow diagram of an embodiment of a method for obtaining a sampled beam pattern of a network device.

Referring to FIG. 13, an embodiment of a method 1300 for obtaining a sampled beam pattern for a network device (e.g., BS 302 or UE 304) includes the stages shown. The method 1300 is, however, an example only and not limiting. The method 1300 may be altered, e.g., by having one or more stages added, removed, rearranged, combined, performed concurrently, and/or by having one or more single stages split into multiple stages.

At stage 1310, the method 1300 includes configuring a beam pattern information comprising a sampling method of a plurality of sampling methods defining a sampling grid. The one or more processors 610 of the beam pattern processing device 600, possibly in combination with the one or more memories 611, may comprise means for configuring the beam pattern information. For example, the beam pattern processing device 600 may configure a first beam pattern information that may include a first sampling method, a first segmenting method, and first sampling direction densities. The beam pattern processing device 600 may send, to the beam pattern reporting device 500, a first request message with the first beam pattern information for a first sampled beam pattern of the beam pattern reporting device 500 with a first resolution. As a response, the beam pattern processing device 600 may receive a first response message, from the beam pattern reporting device 500, that comprises the first sampled beam pattern of the beam pattern reporting device 500. The beam pattern processing device 600 may analyze the variations in the beam gains of the first sampled beam pattern. The beam pattern processing device 600 may configure a second beam pattern information based on the variations. The second beam pattern information may include a second sampling method, a second segmenting method, and second sampling direction densities. When multiple beam patterns have been generated by the manufacturer of the beam pattern reporting device 500 using multiple sampling methods, the beam pattern processing device 600 may select a specific sampling method to include in the second sampling method based on the requirements of the application for which beam gains will be obtained.

At stage 1320, the method 1300 includes sending a request for a sampled beam pattern of the network device, the request comprising the beam pattern information. The one or more processors 610 of the beam pattern processing device 600, possibly in combination with the one or more memories 611, may comprise means for sending the request for the sampled beam pattern of the network device. For example, the beam pattern processing device 600 may send, to the beam pattern reporting device 500, a second request message that may include the second beam pattern information for a second sampled beam pattern of the beam pattern reporting device 500 with a second resolution.

At stage 1330, the method 1300 includes receiving the sampled beam pattern obtained based on the beam pattern information. The one or more processors 610 of the beam pattern processing device 600, possibly in combination with the one or more memories 611, may comprise means for receiving the sampled beam pattern obtained based on the beam pattern information. For example, the beam pattern processing device 600 may receive the second sampled beam pattern from the beam pattern reporting device 500. In response to receiving second sampled beam pattern, the beam pattern processing device 600 may obtain beam gains in one or more arbitrary directions using the second sampled beam pattern.

Figure 14:
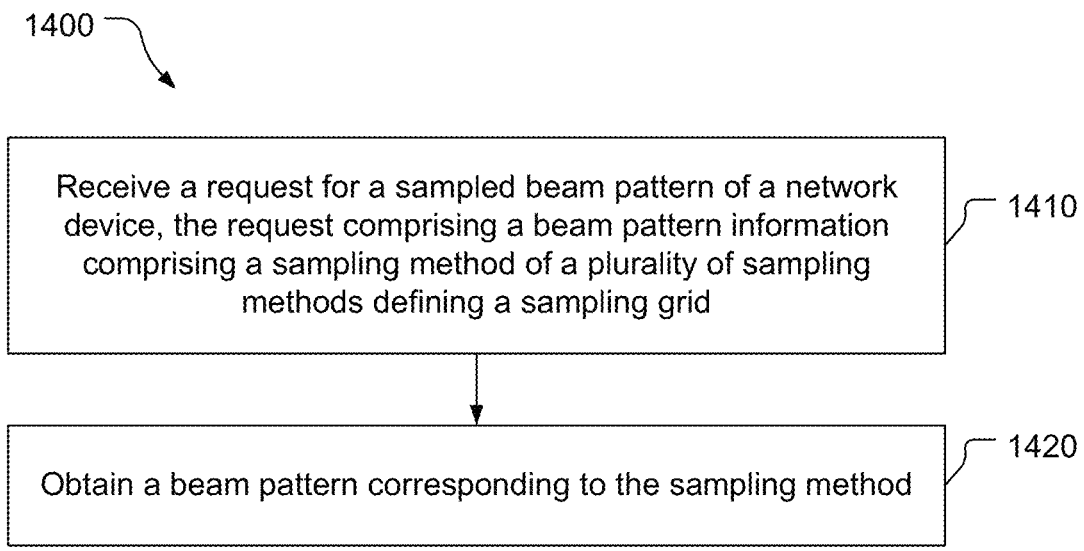
FIG. 14 is a block flow diagram of an embodiment of a method for providing a sampled beam pattern of a network device.

Referring to FIG. 14, an embodiment of a method 1400 for providing a sampled beam pattern for a network device (e.g., BS 302 or UE 304) includes the stages shown. The method 1400 is, however, an example only and not limiting. The method 1400 may be altered, e.g., by having one or more stages added, removed, rearranged, combined, performed concurrently, and/or by having one or more single stages split into multiple stages. At stage 1410, the method 1400 includes receiving a request for a sampled beam pattern of a network device, the request comprising a beam pattern information comprising a sampling method of a plurality of sampling methods defining a sampling grid. The one or more processors 510 of the beam pattern reporting device 500, possibly in combination with the one or more memories 511, may comprise means for receiving the request for the sampled beam pattern of the network device. For example, the beam pattern reporting device 500 may receive, from the beam pattern processing device 600, a first request message with a first beam pattern information for a first sampled beam pattern of the beam pattern reporting device 500 with a first resolution. The first beam pattern information may include a first sampling method, a first segmenting method, and first sampling direction densities. In response to the first request message, the beam pattern reporting device 500 may obtain a first beam pattern corresponding the first sampling method. The first beam pattern reporting device 500 may apply the first beam pattern information to the first beam pattern. The beam pattern reporting device 500 may send, to the beam pattern processing device 600, a first response message that comprises the first sampled beam pattern of the beam pattern reporting device 500. The beam pattern reporting device 500 may receive, from the beam processing device 600, a second request message that may include the second beam pattern information for a second sampled beam pattern of the beam pattern reporting device 500 with a second resolution.

At stage 1420, the method 1400 includes obtaining a beam pattern corresponding to the sampling method. The one or more processors 510 of the beam pattern reporting device 500, possibly in combination with the one or more memories 511, may comprise means for obtaining the beam pattern corresponding to the sampling method. For example, in response to the second request message, the beam pattern reporting device 500 may obtain a second beam pattern corresponding the second sampling method. The beam pattern reporting device 500 may apply the second beam pattern information to the second beam pattern.

At stage 1430, the method 1400 includes sending a response to the request, the response comprising the second sampled beam pattern. The one or more processors 510 of the beam pattern reporting device 500, possibly in combination with the one or more memories 511, may comprise means for sending the response to the request. For example, the beam pattern reporting device 500 may send, to the beam pattern processing device 600, a second message that comprises the second sampled beam pattern of the beam pattern reporting device 500.

In another embodiment, a sampling technique of a non-uniform distribution of directions may be used to sample the beams transmitted by the beam pattern reporting device 500, in combination with a rotation of the sampling grid. The unit sphere 450, shown in FIG. 4B and described above, illustrates a spherical sampling grid with the sampling of the beam shape in a non-uniform distribution of directions prior to rotation. In sampling the beams transmitted by the beam pattern reporting device 500, the spherical sampling grid 450 may be rotated to align the polar directions in the spherical sampling grid 450 with a direction of interest. The direction of interest may be based on, e.g., a direction with greater beam gain variations than other directions. Since more samples are obtained at the polar directions than at other directions on the spherical sampling grid 450 when an equal angle spacing sampling technique is used, by rotating the spherical sampling grid 450 in this manner, the direction with greater beam gain variations would be sampled with denser directions than other directions. In this embodiment, no segmenting method is applied to the spherical sampling grid 450. Alternatively, a single region may be defined to comprise the entire spherical sampling grid 450 and one sampling direction density may be associated with the entire spherical sampling grid 450. A quaternion vector representing an axis of rotation associated with the rotated sampling grid may be calculated and sent to the beam pattern processing device 600 along with the beam pattern of the beam pattern reporting device 500. The beam pattern processing device 600 may use the quaternion vector to rotate the sampling grid used by the beam pattern processing device 600.

In another embodiment, after a period of time of use in the network, the beam pattern of the beam pattern reporting device 500 may change. The beam pattern reporting device 500 may determine the beam pattern reporting device's 500 updated beam pattern using monostatic sensing. For example, a beam pattern reporting device 500 may transmit signals, receive the same signals reflected off an object of known distance away from beam pattern reporting device 500, and measure the RSRP. The beam pattern reporting device 500 may repeat this process with different orientations of the beam pattern reporting device 500. The beam pattern reporting device 500 may then calculate the beam gains and determine the updated beam pattern. By comparing the updated beam pattern with the existing beam pattern, the beam pattern reporting device 500 may calculate a direction correction value (e.g., another rotation matrix or quaternion vector). The direction correction value represents the angular difference between a direction in the updated beam pattern and a closest direction in the existing beam pattern. The direction correction value may be provided to the beam pattern processing device 600 to calibrate the directions used to obtain one or more beam gains in one or more arbitrary directions.

Figure 15:
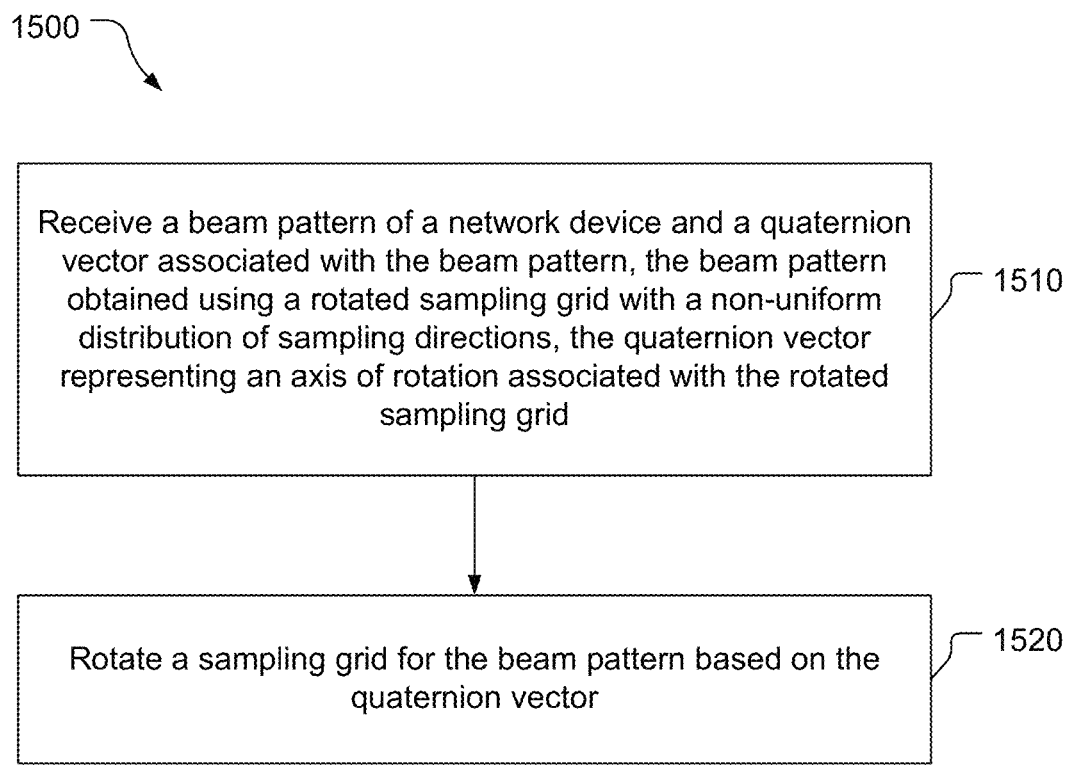
FIG. 15 is a block flow diagram of an embodiment of a method for sampling a beam using a beam pattern of a network device.

Referring to FIG. 15, a method 1500 for sampling a beam using a beam pattern for a network device (e.g., BS 302 or UE 304) includes the stages shown. The method 1500 is, however, an example only and not limiting. The method 1500 may be altered, e.g., by having one or more stages added, removed, rearranged, combined, performed concurrently, and/or by having one or more single stages split into multiple stages. At stage 1510, the method 1500 includes receiving a beam pattern of a network device and a quaternion vector associated with the beam pattern, the beam pattern obtained using a rotated sampling grid with a non-uniform distribution of sampling directions (e.g., an equal angle spacing sampling method), the quaternion vector representing an axis of rotation associated with the rotated sampling grid. The one or more processors 610 of the beam pattern processing node 600, possibly in combination with the one or more memories 611, may comprise means for receiving the beam pattern of the network device and the quaternion vector associated with the beam pattern. At stage 1520, the method 1500 includes rotating a sampling grid for the beam pattern based on the quaternion vector. The one or more processors 610 of the beam pattern processing node 600, possibly in combination with the one or more memories 611, may comprise means for rotating the sampling grid for the beam pattern based on the quaternion vector.

Implementation Examples

Implementation examples are provided in the following numbered clauses.

Clause 1. A beam pattern processing device, comprising:
one or more memories;
a transceiver; and
one or more processors, communicatively coupled to the one or more memories and the transceiver, configured to:
configure a beam pattern information comprising a sampling method of a plurality of sampling methods, the sampling method defining a sampling grid;
send a request for a sampled beam pattern of a network device, the request comprising the beam pattern information; and
receive the sampled beam pattern obtained based on the beam pattern information.

Clause 2. The beam pattern processing device of clause 1, wherein the sampling method provides the sampling grid with a uniform distribution of sampling directions.

Clause 3. The beam pattern processing device of clause 1, wherein the beam pattern processing device comprises a user equipment, wherein the network device comprises a base station.

Clause 4. The beam pattern processing device of clause 1, wherein the beam pattern information further comprises: a segmenting method defining one or more regions of the sampling grid based on variations in beam gains of a first sampled beam pattern of the network device.

Clause 5. The beam pattern processing device of clause 4, wherein the beam pattern information further comprises: one or more sampling direction densities associating a sampling direction density to each of the one or more regions.

Clause 6. The beam pattern processing device of clause 5, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 7. The beam pattern processing device of clause 4, wherein in sending the request for the sampled beam pattern and in receiving the sampled beam pattern, the one or more processors are configured to: send a request for a second sampled beam pattern of the network device, the request for the second sampled beam pattern comprising the beam pattern information; and receive the second sampled beam pattern obtained based on the beam pattern information.

Clause 8. The beam pattern processing device of clause 7, wherein the one or more processors are further configured to obtain one or more beam gains in one or more arbitrary directions using the second sampled beam pattern.

Clause 9. The beam pattern processing device of clause 7, wherein the second sampled beam pattern comprises a higher resolution than the first sampled beam pattern.

Clause 10. A method for providing a beam pattern of a network device, comprising: configuring a beam pattern information comprising a sampling method of a plurality of sampling methods, the sampling method defining a sampling grid; sending a request for a sampled beam pattern of the network device, the request comprising the beam pattern information; and receiving the sampled beam pattern obtained based on the beam pattern information.

Clause 11. The method of clause 10, wherein the sampling method provides the sampling grid with a uniform distribution of sampling directions.

Clause 12. The method of clause 10, wherein the beam pattern information further comprises: a segmenting method defining one or more regions of the sampling grid based on variations in beam gains of a first sampled beam pattern of the network device.

Clause 13. The method of clause 12, wherein the beam pattern information further comprises: one or more sampling direction densities associating a sampling direction density to each of the one or more regions.

Clause 14. The method of clause 13, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 15. The method of clause 12, wherein the sending of the request for the sampled beam pattern and the receiving of the sampled beam pattern comprise: sending a request for a second sampled beam pattern of the network device, the request for the second sampled beam pattern comprising the beam pattern information; and receiving the second sampled beam pattern obtained based on the beam pattern information.

Clause 16. The method of clause 15, further comprising: obtaining one or more beam gains in one or more arbitrary directions using the second sampled beam pattern.

Clause 17. The method of clause 15, wherein the second sampled beam pattern comprises a higher resolution than the first sampled beam pattern.

Clause 18. A beam pattern processing device, comprising:
means for configuring a beam pattern information, the beam pattern information comprising a sampling method of a plurality of sampling methods defining a sampling grid;
means for sending a request for a sampled beam pattern of a network device, the request comprising the beam pattern information; and
means for receiving the sampled beam pattern obtained based on the beam pattern information.

Clause 19. The beam pattern processing device of clause 18, wherein the sampling method provides the sampling grid with a uniform distribution of sampling directions.

Clause 20. The beam pattern processing device of clause 18, wherein the beam pattern information further comprises: a segmenting method defining one or more regions of the sampling grid based on variations in beam gains of a first sampled beam pattern of the network device.

Clause 21. The beam pattern processing device of clause 20, wherein the beam pattern information further comprises: one or more sampling direction densities associating a sampling direction density to each of the one or more regions.

Clause 22. The beam pattern processing device of clause 21, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 23. The beam pattern processing device of clause 20, wherein the means for sending the request for the sampled beam pattern and the means for receiving the sampled beam pattern comprise: means for sending a request for a second sampled beam pattern of the network device, the request for the second sampled beam pattern comprising the beam pattern information; and means for receiving the second sampled beam pattern obtained based on the beam pattern information.

Clause 24. The beam pattern processing device of clause 23, further comprising: means for obtaining one or more beam gains in one or more arbitrary directions using the second sampled beam pattern.

Clause 25. The beam pattern processing device of clause 23, wherein the second sampled beam pattern comprises a higher resolution than the first sampled beam pattern.

Clause 26. A non-transitory, processor-readable storage medium comprising processor-readable instructions to cause one or more processors of a beam pattern processing device to: configure a beam pattern information comprising a sampling method of a plurality of sampling methods defining a sampling grid; send a request for a sampled beam pattern of a network device, the request comprising the beam pattern information; and receive the sampled beam pattern obtained based on the beam pattern information.

Clause 27. The medium of clause 26, wherein the sampling method provides the sampling grid with a uniform distribution of sampling directions.

Clause 28. The medium of clause 26, wherein the beam pattern information further comprises: a segmenting method defining one or more regions of the sampling grid based on variations in beam gains of a first sampled beam pattern of the network device.

Clause 29. The medium of clause 28, wherein the beam pattern information further comprises: one or more sampling direction densities associating a sampling direction density to each of the one or more regions.

Clause 30. The medium of clause 29, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 31. A beam pattern processing device, comprising:
one or more memories;
a transceiver; and
one or more processors, communicatively coupled to the one or more memories and the transceiver, configured to:
configure a beam pattern information, the beam pattern information comprising a segmenting method and one or more sampling direction densities, the segmenting method defining one or more regions of a sampling grid, the one or more sampling direction densities associating a sampling direction density to each of the one or more regions;
send a request for a sampled beam pattern of a network device, the request comprising the beam pattern information; and
receive the sampled beam pattern obtained based on the beam pattern information.

Clause 32. The beam pattern processing device of clause 31, wherein the beam pattern information further comprises: the sampling method defining the sampling grid.

Clause 33. The beam pattern processing device of clause 32, wherein the sampling method provides the sampling grid with a uniform distribution of sampling directions.

Clause 34. The beam pattern processing device of clause 31, wherein the beam pattern processing device comprises a user equipment, wherein the network device comprises a base station.

Clause 35. The beam pattern processing device of clause 31, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 36. The beam pattern processing device of clause 31, wherein the one or more regions of the sampling grid are based on variations in beam gains for a first sampled beam pattern of the network device.

Clause 37. The beam pattern processing device of clause 36, wherein in sending the request for the sampled beam pattern and in receiving the sampled beam pattern, the one or more processors are configured to: send a request for a second sampled beam pattern of the network device, the request for the second sampled beam pattern comprising the beam pattern information; and receive the second sampled beam pattern obtained based on the beam pattern information.

Clause 38. The beam pattern processing device of clause 37, wherein the second sampled beam pattern comprises a higher resolution than the first sampled beam pattern.

Clause 39. A method for providing a beam pattern of a network device, comprising:
configuring a beam pattern information, the beam pattern information comprising a segmenting method and one or more sampling direction densities, the segmenting method defining one or more regions of a sampling grid, the one or more sampling direction densities associating a sampling direction density to each of the one or more regions;
sending a request for a sampled beam pattern of the network device, the request comprising the beam pattern information; and
receiving the sampled beam pattern obtained based on the beam pattern information.

Clause 40. The method of clause 39, wherein the beam pattern information further comprises: a sampling method defining the sampling grid.

Clause 41. The method of clause 40, wherein the sampling method provides the sampling grid with a uniform distribution of sampling directions.

Clause 42. The method of clause 39, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 43. The method of clause 39, wherein the one or more regions of the sampling grid are based on variations in beam gains for a first sampled beam pattern of the network device.

Clause 44. The method of clause 43, wherein the sending of the request for the sampled beam pattern and the receiving of the sampled beam pattern comprise: sending a request for a second sampled beam pattern of the network device, the request for the second sampled beam pattern comprising the beam pattern information; and receiving the second sampled beam pattern obtained based on the beam pattern information.

Clause 45. The method of clause 44, wherein the second sampled beam pattern comprises a higher resolution than the first sampled beam pattern.

Clause 46. A beam pattern processing device, comprising:
means for configuring a beam pattern information, the beam pattern information comprising a segmenting method and one or more sampling direction densities, the segmenting method defining one or more regions of a sampling grid, the one or more sampling direction densities associating a sampling direction density to each of the one or more regions;
means for sending a request for a sampled beam pattern of a network device, the request comprising the beam pattern information; and
means for receiving the sampled beam pattern obtained based on the beam pattern information.

Clause 47. The beam pattern processing device of clause 46, wherein the beam pattern information further comprises: a sampling method defining the sampling grid.

Clause 48. The beam pattern processing device of clause 47, wherein the sampling method provides the sampling grid with a uniform distribution of sampling directions.

Clause 49. The beam pattern processing device of clause 46, wherein the one or more regions comprise a first region comprising one or more first directions and a second region comprising one or more second directions,
wherein the first region is associated with a first sampling direction density of the one or more sampling direction densities, wherein the second region is associated with a second sampling direction density of the one or more sampling direction densities, and
wherein the one or more first directions comprises higher variations of beam gains than the one or more second directions, wherein the first sampling direction density is denser than the second sampling direction density.

Clause 50. The beam pattern processing device of clause 46, wherein the one or more regions of the sampling grid are based on variations in beam gains for a first sampled beam pattern of the network device.

Clause 51. The beam pattern processing device of clause 50, wherein the means for sending the request for the sampled beam pattern and the means for receiving the sampled beam pattern comprise: means for sending a request for a second sampled beam pattern of the network device, the request for the second sampled beam pattern comprising the beam pattern information; and means for receiving the second sampled beam pattern obtained based on the beam pattern information.

Clause 52. The beam pattern processing device of clause 51, wherein the second sampled beam pattern comprises a higher resolution than the first sampled beam pattern.

Clause 53. A non-transitory, processor-readable storage medium comprising processor-readable instructions to cause one or more processors of a beam pattern processing device to:
configure a beam pattern information, the beam pattern information comprising a segmenting method and one or more sampling direction densities, the segmenting method defining one or more regions of a sampling grid, the one or more sampling direction densities associating a sampling direction density to each of the one or more regions;
send a request for a sampled beam pattern of a network device, the request comprising the beam pattern information; and
receive the sampled beam pattern obtained based on the beam pattern information.

Clause 54. The medium of clause 53, wherein the beam pattern information further comprises: a sampling method defining the sampling grid.

Clause 55. The medium of clause 54, wherein the sampling method provides the sampling grid with a uniform distribution of sampling directions.

Clause 56. The medium of clause 53, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 57. The medium of clause 53, wherein the one or more regions of the sampling grid are based on variations in beam gains for a first sampled beam pattern of the network device.

Clause 58. The medium of clause 57, wherein in sending the request for the sampled beam pattern and in receiving the sampled beam pattern, the one or more processor are configured to: send a request for a second sampled beam pattern of the network device, the request for the second sampled beam pattern comprising the beam pattern information; and receive the second sampled beam pattern obtained based on the beam pattern information.

Clause 59. The medium of clause 58, wherein the second sampled beam pattern comprises a higher resolution than the first sampled beam pattern.

Clause 60. A beam pattern reporting device, comprising:
one or more memories;
a transceiver; and
one or more processors, communicatively coupled to the one or more memories and the transceiver, configured to:

receive a request for a sampled beam pattern of a network device, the request comprising a beam pattern information comprising a sampling method of a plurality of sampling methods defining a sampling grid; and obtain a beam pattern corresponding to the sampling method.

Clause 61. The beam pattern reporting device of clause 60, wherein the sampling method provides the sampling grid with a uniform distribution of sampling directions.

Clause 62. The beam pattern reporting device of clause 60, wherein the beam pattern information further comprises: a segmenting method defining one or more regions of the sampling grid based on variations in beam gains of a first sampled beam pattern of the network device, wherein the one or more processors are further configured to apply the segmenting method to the sampling grid.

Clause 63. The beam pattern reporting device of clause 62, wherein the beam pattern information further comprises: one or more sampling direction densities associating a sampling direction density to each of the one or more regions, wherein the one or more processors are further configured to apply the one or more sampling direction densities to the sampling grid to obtain the sampled beam pattern.

Clause 64. The beam pattern reporting device of clause 63, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 65. The beam pattern reporting device of clause 60, wherein the network device comprises a base station.

Clause 66. A method for providing a beam pattern of a network device, comprising:

receiving a request for a sampled beam pattern of the network device, the request comprising a beam pattern information comprising a sampling method of a plurality of sampling methods defining a sampling grid; and obtaining the beam pattern corresponding to the sampling method.

Clause 67. The method of clause 66, wherein the sampling method provides the sampling grid with a uniform distribution of sampling directions.

Clause 68. The method of clause 66, wherein the beam pattern information further comprises: a segmenting method defining one or more regions of the sampling grid based on variations in beam gains of a first sampled beam pattern of the network device, wherein the method further comprises applying the segmenting method to the sampling grid.

Clause 69. The method of clause 68, wherein the beam pattern information further comprises: one or more sampling direction densities associating a sampling direction density to each of the one or more regions, wherein the method further comprises applying the one or more sampling direction densities to the sampling grid to obtain the sampled beam pattern.

Clause 70. The method of clause 69, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 71. A beam pattern reporting device, comprising:

means for receiving a request for a sampled beam pattern of a network device, the request comprising a beam pattern information comprising a sampling method of a plurality of sampling methods defining a sampling grid; and means for obtaining the beam pattern corresponding to the sampling method.

Clause 72. The beam pattern reporting device of clause 71, wherein the sampling method provides the sampling grid with a uniform distribution of sampling directions.

Clause 73. The beam pattern reporting device of clause 71, wherein the beam pattern information further comprises: a segmenting method defining one or more regions of the sampling grid based on variations in beam gains of a first sampled beam pattern of the network device, wherein the beam pattern reporting device further comprises means for applying the segmenting method to the sampling grid.

Clause 74. The beam pattern reporting device of clause 73, wherein the beam pattern information further comprises: one or more sampling direction densities associating a sampling direction density to each of the one or more regions, wherein the beam pattern reporting device further comprises means for applying the one or more sampling direction densities to the sampling grid to obtain the sampled beam pattern.

Clause 75. The beam pattern reporting device of clause 74, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 76. A non-transitory, processor-readable storage medium comprising processor-readable instructions to cause one or more processors of a beam pattern processing device to:

receive a request for a sampled beam pattern of a network device, the request comprising a beam pattern information comprising a sampling method of a plurality of sampling methods defining a sampling grid; and obtain a beam pattern corresponding to the sampling method.

Clause 77. The medium of clause 76, wherein the sampling method provides the sampling grid with a uniform distribution of sampling directions.

Clause 78. The medium of clause 76, wherein the beam pattern information further comprises: a segmenting method defining one or more regions of the sampling grid based on variations in beam gains of a first sampled beam pattern of the network device, wherein the one or more processors are further configured to apply the segmenting method to the sampling grid.

Clause 79. The medium of clause 78, wherein the beam pattern information further comprises: one or more sampling direction densities associating a sampling direction density to each of the one or more regions, wherein the one or more processors are further configured to apply the one or more sampling direction densities to the sampling grid to obtain the sampled beam pattern.

Clause 80. The medium of clause 79, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 81. A beam pattern reporting device, comprising:
one or more memories;
a transceiver; and
one or more processors, communicatively coupled to the one or more memories and the transceiver, configured to:
  receive a request for a sampled beam pattern of a network device, the request comprising a beam pattern information, the beam pattern information comprising a segmenting method defining one or more regions of a sampling grid and one or more sampling direction densities associating a sampling direction density to each of the one or more regions; and
  apply the segmenting method and the one or more sampling direction densities to the sampling grid to obtain the sampled beam pattern.

Clause 82. The beam pattern reporting device of clause 81, wherein the beam pattern information further comprises: a sampling method defining the sampling grid.

Clause 83. The beam pattern reporting device of clause 82, wherein the sampling method provides the sampling grid with a uniform distribution of sampling directions.

Clause 84. The beam pattern reporting device of clause 81, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 85. The beam pattern reporting device of clause 81, wherein the one or more regions of the sampling grid are based on variations in beam gains for a first sampled beam pattern of the network device.

Clause 86. The beam pattern reporting device of clause 81, wherein the network device comprises a base station.

Clause 87. A method for providing a beam pattern of a network device, comprising:
receiving a request for a sampled beam pattern of the network device, the request comprising a beam pattern information, the beam pattern information comprising a segmenting method defining one or more regions of a sampling grid and one or more sampling direction densities associating a sampling direction density to each of the one or more regions; and
applying the segmenting method and the one or more sampling direction densities to the sampling grid to obtain the sampled beam pattern.

Clause 88. The method of clause 87, wherein the beam pattern information further comprises: a sampling method defining the sampling grid.

Clause 89. The method of clause 88, wherein the sampling method provides the sampling grid with a uniform distribution of sampling directions.

Clause 90. The method of clause 87, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 91. The method of clause 87, wherein the one or more regions of the sampling grid are based on variations in beam gains for a first sampled beam pattern of the network device.

Clause 92. A beam pattern reporting device, comprising:
means for receiving a request for a sampled beam pattern of a network device, the request comprising a beam pattern information, the beam pattern information comprising a segmenting method defining one or more regions of a sampling grid and one or more sampling direction densities associating a sampling direction density to each of the one or more regions; and
means for applying the segmenting method and the one or more sampling direction densities to the sampling grid to obtain the sampled beam pattern.

Clause 93. The beam pattern reporting device of clause 92, wherein the beam pattern information further comprises: a sampling method defining the sampling grid.

Clause 94. The beam pattern reporting device of clause 93, wherein the sampling method provides the sampling grid with a uniform distribution of sampling directions.

Clause 95. The beam pattern reporting device of clause 92, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 96. The beam pattern reporting device of clause 92, wherein the one or more regions of the sampling grid are based on variations in beam gains for a first sampled beam pattern of the network device.

Clause 97. A non-transitory, processor-readable storage medium comprising processor-readable instructions to cause one or more processors of a beam pattern processing device to:
receive a request for a sampled beam pattern of a network device, the request comprising a beam pattern information, the beam pattern information comprising a segmenting method defining one or more regions of a sampling grid and one or more sampling direction densities associating a sampling direction density to each of the one or more regions; and apply the segmenting method and the one or more sampling direction densities to the sampling grid to obtain the sampled beam pattern.

Clause 98. The medium of clause 97, wherein the beam pattern information further comprises: a sampling method defining the sampling grid.

Clause 99. The medium of clause 98, wherein the sampling method provides the sampling grid with a uniform distribution of sampling directions.

Clause 100. The medium of clause 97, wherein the one or more regions comprise a first region comprising one or more first directions and a second region comprising one or more second directions, wherein the first region is associated with a first sampling direction density of the one or more sampling direction densities, wherein the second region is associated with a second sampling direction density of the one or more sampling direction densities, and wherein the one or more first directions comprises higher variations of beam gains than the one or more second directions, wherein the first sampling direction density is denser than the second sampling direction density.

Clause 101. The medium of clause 97, wherein the one or more regions of the sampling grid are based on variations in beam gains for a first sampled beam pattern of the network device.

Clause 102. A beam pattern processing device, comprising:
one or more memories;
a transceiver; and
one or more processors, communicatively coupled to the one or more memories and the transceiver, configured to:
receive a beam pattern of a network device and a quaternion vector associated with the beam pattern, the beam pattern obtained using a rotated sampling grid with a non-uniform distribution of sampling directions, the quaternion vector representing an axis of rotation associated with the rotated sampling grid; and
rotate a sampling grid for the beam pattern based on the quaternion vector.

Clause 103. The beam pattern processing device of clause 102, wherein a rotation of the sampling grid aligns one or more polar directions in the sampling grid with a direction of interest.

Clause 104. The beam pattern processing device of clause 103, wherein the direction of interest comprises a direction with greater beam gain variations than other directions.

Clause 105. The beam pattern processing device of clause 102, wherein the one or more processors are further configured to: receive a direction correction value for an updated beam pattern of the network device; and further rotate the sampling grid based on the direction correction value.

Clause 106. A method for obtaining a beam pattern of a network device, comprising: receiving the beam pattern of the network device and a quaternion vector associated with the beam pattern, the beam pattern obtained using a rotated sampling grid with a non-uniform distribution of sampling directions, the quaternion vector representing an axis of rotation associated with the rotated sampling grid; and rotating a sampling grid for the beam pattern based on the quaternion vector.

Clause 107. The method of clause 106, wherein a rotation of the sampling grid aligns one or more polar directions in the sampling grid with a direction of interest.

Clause 108. The method of clause 107, wherein the direction of interest comprises a direction with greater beam gain variations than other directions.

Clause 109. The method of clause 106, further comprising: receiving a direction correction value for an updated beam pattern of the network device; and further rotating the sampling grid based on the direction correction value.

Clause 110. A beam pattern reporting device, comprising:
means for receiving a beam pattern of a network device and a quaternion vector associated with the beam pattern, the beam pattern obtained using a rotated sampling grid with a non-uniform distribution of sampling directions, the quaternion vector representing an axis of rotation associated with the rotated sampling grid; and
means for rotating a sampling grid for the beam pattern based on the quaternion vector.

Clause 111. The beam pattern reporting device of clause 110, wherein a rotation of the sampling grid aligns one or more polar directions in the sampling grid with a direction of interest.

Clause 112. The beam pattern reporting device of clause 111, wherein the direction of interest comprises a direction with greater beam gain variations than other directions.

Clause 113. The beam pattern reporting device of clause 110, further comprising: means for receiving a direction correction value for an updated beam pattern of the network device; and means for further rotating the sampling grid based on the direction correction value.

Clause 114. A non-transitory, processor-readable storage medium comprising processor-readable instructions to cause one or more processors of a beam pattern processing device to:
receive a beam pattern of a network device and a quaternion vector associated with the beam pattern, the beam pattern obtained using a rotated sampling grid with a non-uniform distribution of sampling directions, the quaternion vector representing an axis of rotation associated with the rotated sampling grid; and
rotate a sampling grid for the beam pattern based on the quaternion vector.

Clause 115. The medium of clause 114, wherein a rotation of the sampling grid aligns one or more polar directions in the sampling grid with a direction of interest.

Clause 116. The medium of clause 115, wherein the direction of interest comprises a direction with greater beam gain variations than other directions.

Clause 117. The medium of clause 114, wherein the one or more processors are further configured to: receive a direction correction value for an updated beam pattern of the network device; and further rotate the sampling grid based on the direction correction value.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of +20% or +10%, +5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of +20% or +10%, +5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A beam pattern processing device, comprising:
   one or more memories;
   one or more transceivers; and
   one or more processors, communicatively coupled to the one or more memories and the one or more transceivers, configured to:
      configure beam pattern information comprising a sampling method of a plurality of sampling methods, the sampling method defining a sampling grid;
      send, via the one or more transceivers to a beam pattern reporting device, a request for the beam pattern reporting device to provide a sampled beam pattern of a network device, the request comprising the beam pattern information and the sampled beam pattern comprising beam gains and corresponding directions; and
      receive the sampled beam pattern obtained based on the beam pattern information.

2. The beam pattern processing device of claim 1, wherein the sampling method provides the sampling grid with a uniform distribution of sampling directions.

3. The beam pattern processing device of claim 1, wherein the beam pattern processing device comprises a user equipment, and wherein the network device comprises a base station.

4. The beam pattern processing device of claim 1, wherein the beam pattern information further comprises:
   a segmenting method defining one or more regions of the sampling grid based on variations in beam gains of a first sampled beam pattern of the network device.

5. The beam pattern processing device of claim 4, wherein the beam pattern information further comprises:
   one or more sampling direction densities associating a sampling direction density to each of the one or more regions.

6. A beam pattern processing device, comprising:
   one or more memories;
   a transceiver; and
   one or more processors, communicatively coupled to the one or more memories and the transceiver, configured to:
      configure beam pattern information comprising a sampling method of a plurality of sampling methods, the sampling method defining a sampling grid;
      send a request for a sampled beam pattern of a network device, the request comprising the beam pattern information; and
      receive the sampled beam pattern obtained based on the beam pattern information;
   wherein the beam pattern information further comprises a segmenting method defining one or more regions of the sampling grid based on variations in beam gains of a first sampled beam pattern of the network device;
   wherein the beam pattern information further comprises one or more sampling direction densities associating a sampling direction density to each of the one or more regions;
   wherein the one or more regions comprise a first region comprising one or more first directions and a second region comprising one or more second directions,
   wherein the first region is associated with a first sampling direction density of the one or more sampling direction densities, and wherein the second region is associated with a second sampling direction density of the one or more sampling direction densities, and
   wherein the one or more first directions comprises higher variations of beam gains than the one or more second directions, and wherein the first sampling direction density is denser than the second sampling direction density.

7. A beam pattern processing device, comprising:
   one or more memories;
   a transceiver; and
   one or more processors, communicatively coupled to the one or more memories and the transceiver, configured to:
      configure beam pattern information comprising a sampling method of a plurality of sampling methods, the sampling method defining a sampling grid;
      send a request for a sampled beam pattern of a network device, the request comprising the beam pattern information; and
      receive the sampled beam pattern obtained based on the beam pattern information;
   wherein the beam pattern information further comprises a segmenting method defining one or more regions of the sampling grid based on variations in beam gains of a first sampled beam pattern of the network device; and;
   wherein to send the request for the sampled beam pattern and in receiving to receive the sampled beam pattern, the one or more processors are configured to:
      send a request for a second sampled beam pattern of the network device, the request for the second sampled beam pattern comprising the beam pattern information; and
      receive the second sampled beam pattern obtained based on the beam pattern information.

8. The beam pattern processing device of claim 7, wherein the one or more processors are further configured to obtain one or more beam gains in one or more arbitrary directions using the second sampled beam pattern.

9. The beam pattern processing device of claim 7, wherein the second sampled beam pattern comprises a higher resolution than the first sampled beam pattern.

10. A method for providing a beam pattern of a network device, the method comprising:
configuring a beam pattern information comprising a sampling method of a plurality of sampling methods, the sampling method defining a sampling grid;
sending, to a beam pattern reporting device, a request for the beam pattern reporting device to provide a sampled beam pattern of the network device, the request comprising the beam pattern information and the sampled beam pattern comprising beam gains and corresponding directions; and
receiving the sampled beam pattern obtained based on the beam pattern information.

11. The method of claim 10, wherein the sampling method provides the sampling grid with a uniform distribution of sampling directions.

12. The method of claim 10, wherein the beam pattern information further comprises:
a segmenting method defining one or more regions of the sampling grid based on variations in beam gains of a first sampled beam pattern of the network device.

13. The method of claim 12, wherein the beam pattern information further comprises:
one or more sampling direction densities associating a sampling direction density to each of the one or more regions.

14. A method for providing a beam pattern of a network device, the method comprising:
configuring beam pattern information comprising a sampling method of a plurality of sampling methods, the sampling method defining a sampling grid;
sending a request for a sampled beam pattern of the network device, the request comprising the beam pattern information; and
receiving the sampled beam pattern obtained based on the beam pattern information;
wherein the beam pattern information further comprises a segmenting method defining one or more regions of the sampling grid based on variations in beam gains of a first sampled beam pattern of the network device;
wherein the beam pattern information further comprises one or more sampling direction densities associating a sampling direction density to each of the one or more regions;
wherein the one or more regions comprise a first region comprising one or more first directions and a second region comprising one or more second directions,
wherein the first region is associated with a first sampling direction density of the one or more sampling direction densities, and wherein the second region is associated with a second sampling direction density of the one or more sampling direction densities, and
wherein the one or more first directions comprises higher variations of beam gains than the one or more second directions, and wherein the first sampling direction density is denser than the second sampling direction density.

15. A method for providing a beam pattern of a network device, the method comprising:
configuring beam pattern information comprising a sampling method of a plurality of sampling methods, the sampling method defining a sampling grid;
sending a request for a sampled beam pattern of the network device, the request comprising the beam pattern information; and
receiving the sampled beam pattern obtained based on the beam pattern information;
wherein the beam pattern information further comprises a segmenting method defining one or more regions of the sampling grid based on variations in beam gains of a first sampled beam pattern of the network device; and
wherein the sending of the request for the sampled beam pattern and the receiving of the sampled beam pattern comprise:
sending a request for a second sampled beam pattern of the network device, the request for the second sampled beam pattern comprising the beam pattern information; and
receiving the second sampled beam pattern obtained based on the beam pattern information.

16. The method of claim 15, further comprising: obtaining one or more beam gains in one or more arbitrary directions using the second sampled beam pattern.

17. The method of claim 15, wherein the second sampled beam pattern comprises a higher resolution than the first sampled beam pattern.

18. A beam pattern processing device, comprising:
means for configuring beam pattern information, the beam pattern information comprising a sampling method of a plurality of sampling methods defining a sampling grid;
means for, to a beam pattern reporting device, a request for the beam pattern reporting device to provide a sampled beam pattern of a network device, the request comprising the beam pattern information and the sampled beam pattern comprising beam gains and corresponding directions; and
means for receiving the sampled beam pattern obtained based on the beam pattern information.

19. The beam pattern processing device of claim 18, wherein the sampling method provides the sampling grid with a uniform distribution of sampling directions.

20. The beam pattern processing device of claim 18, wherein the beam pattern information further comprises:
a segmenting method defining one or more regions of the sampling grid based on variations in beam gains of a first sampled beam pattern of the network device.

21. The beam pattern processing device of claim 20, wherein the beam pattern information further comprises:
one or more sampling direction densities associating a sampling direction density to each of the one or more regions.

22. A beam pattern processing device, comprising:
means for configuring beam pattern information, the beam pattern information comprising a sampling method of a plurality of sampling methods defining a sampling grid;
means for sending a request for a sampled beam pattern of a network device, the request comprising the beam pattern information; and
means for receiving the sampled beam pattern obtained based on the beam pattern information;
wherein the beam pattern information further comprises a segmenting method defining one or more regions of the sampling grid based on variations in beam gains of a first sampled beam pattern of the network device;
wherein the beam pattern information further comprises one or more sampling direction densities associating a sampling direction density to each of the one or more regions;
wherein the one or more regions comprise a first region comprising one or more first directions and a second region comprising one or more second directions, wherein the first region is associated with a first sampling direction density of the one or more sampling direction densities, and wherein the second region is associated with a second sampling direction density of the one or more sampling direction densities, and wherein the one or more first directions comprises higher variations of beam gains than the one or more second directions, and wherein the first sampling direction density is denser than the second sampling direction density.

23. A beam pattern processing device, comprising:

means for configuring beam pattern information, the beam pattern information comprising a sampling method of a plurality of sampling methods defining a sampling grid;

means for sending a request for a sampled beam pattern of a network device, the request comprising the beam pattern information; and means for receiving the sampled beam pattern obtained based on the beam pattern information;

wherein the beam pattern information further comprises a segmenting method defining one or more regions of the sampling grid based on variations in beam gains of a first sampled beam pattern of the network device; and;

wherein the means for sending the request for the sampled beam pattern and the means for receiving the sampled beam pattern comprise:

means for sending a request for a second sampled beam pattern of the network device, the request for the second sampled beam pattern comprising the beam pattern information; and means for receiving the second sampled beam pattern obtained based on the beam pattern information.

24. The beam pattern processing device of claim 23, further comprising: means for obtaining one or more beam gains in one or more arbitrary directions using the second sampled beam pattern.

25. The beam pattern processing device of claim 23, wherein the second sampled beam pattern comprises a higher resolution than the first sampled beam pattern.

26. A non-transitory, processor-readable storage medium comprising processor-readable instructions to cause one or more processors of a beam pattern processing device to:

configure a beam pattern information comprising a sampling method of a plurality of sampling methods defining a sampling grid;

send, to a beam pattern reporting device, a request for the beam pattern reporting device to provide a sampled beam pattern of a network device, the request comprising the beam pattern information and the sampled beam pattern comprising beam gains and corresponding directions; and receive the sampled beam pattern obtained based on the beam pattern information.

27. The medium of claim 26, wherein the sampling method provides the sampling grid with a uniform distribution of sampling directions.

28. The medium of claim 26, wherein the beam pattern information further comprises:

a segmenting method defining one or more regions of the sampling grid based on variations in beam gains of a first sampled beam pattern of the network device.

29. The medium of claim 28, wherein the beam pattern information further comprises:

one or more sampling direction densities associating a sampling direction density to each of the one or more regions.

30. A non-transitory, processor-readable storage medium comprising processor-readable instructions to cause one or more processors of a beam pattern processing device to:

configure a beam pattern information comprising a sampling method of a plurality of sampling methods defining a sampling grid;

send a request for a sampled beam pattern of a network device, the request comprising the beam pattern information; and receive the sampled beam pattern obtained based on the beam pattern information;

wherein the beam pattern information further comprises a segmenting method defining one or more regions of the sampling grid based on variations in beam gains of a first sampled beam pattern of the network device;

wherein the beam pattern information further comprises one or more sampling direction densities associating a sampling direction density to each of the one or more regions;

wherein the one or more regions comprise a first region comprising one or more first directions and a second region comprising one or more second directions, wherein the first region is associated with a first sampling direction density of the one or more sampling direction densities, and wherein the second region is associated with a second sampling direction density of the one or more sampling direction densities, and wherein the one or more first directions comprises higher variations of beam gains than the one or more second directions, and wherein the first sampling direction density is denser than the second sampling direction density.

31. A non-transitory, processor-readable storage medium comprising processor-readable instructions to cause one or more processors of a beam pattern processing device to:

configure a beam pattern information comprising a sampling method of a plurality of sampling methods defining a sampling grid;

send a request for a sampled beam pattern of a network device, the request comprising the beam pattern information; and receive the sampled beam pattern obtained based on the beam pattern information;

wherein the beam pattern information further comprises a segmenting method defining one or more regions of the sampling grid based on variations in beam gains of a first sampled beam pattern of the network device;

wherein the processor-readable instructions to cause the one or more processors to send the request for the sampled beam pattern comprise processor-readable instructions to cause the one or more processors to send a request for a second sampled beam pattern of the network device, the request for the second sampled beam pattern comprising the beam pattern information; and wherein the processor-readable instructions to cause the one or more processors to receive the sampled beam pattern comprise processor-readable instructions to cause the one or more processors to receive the second sampled beam pattern obtained based on the beam pattern information.

* * * * *